United States Patent

Kobayashi et al.

[11] Patent Number: 5,711,454
[45] Date of Patent: Jan. 27, 1998

[54] LAMINATED BOTTLE AND PUMP DEVICE THEREFOR

[75] Inventors: Tsutomu Kobayashi; Akira Nishigami, both of Ibaraki, Japan

[73] Assignee: Yoshino Kogyosho Co., Ltd., Tokyo, Japan

[21] Appl. No.: 445,034

[22] Filed: May 19, 1995

Related U.S. Application Data

[62] Division of Ser. No. 175,390, Feb. 1, 1994, Pat. No. 5,513,761.

[30] Foreign Application Priority Data

| May 11, 1992 | [JP] | Japan | 4-117756 |
| May 14, 1992 | [JP] | Japan | 4-122198 |
| May 14, 1992 | [JP] | Japan | 4-122199 |
| Sep. 4, 1992 | [JP] | Japan | 4-62421 |
| Oct. 23, 1992 | [JP] | Japan | 4-74190 |
| Apr. 6, 1993 | [JP] | Japan | 5-17182 |

[51] Int. Cl.⁶ .................................... B65D 35/28
[52] U.S. Cl. .................... 222/95; 222/105; 222/183; 222/382; 222/464.1
[58] Field of Search .................. 222/95, 105, 183, 222/211, 382, 464.1, 464.2

[56] References Cited

U.S. PATENT DOCUMENTS

| 2,133,411 | 2/1938 | Zohe . |
| 3,288,334 | 11/1966 | Corsette ........................ 222/464.1 X |
| 3,420,413 | 1/1969 | Corsette . |
| 3,876,115 | 4/1975 | Venus, Jr. et al. ............... 222/183 |
| 3,981,415 | 9/1976 | Fowler et al. .................... 222/95 |
| 4,000,830 | 1/1977 | Meshberg ........................ 222/95 |
| 4,286,636 | 9/1981 | Credle ........................... 222/501 X |
| 4,322,020 | 3/1982 | Stone ............................ 222/95 |
| 4,783,176 | 11/1988 | Ichikawa . |
| 5,156,300 | 10/1992 | Spahni et al. .................... 222/464.1 X |
| 5,169,037 | 12/1992 | Davies et al. . |
| 5,242,085 | 9/1993 | Richter et al. ................... 222/105 |
| 5,292,033 | 3/1994 | Gueret .......................... 222/105 X |
| 5,301,838 | 4/1994 | Schmidt et al. .................. 222/105 X |
| 5,513,761 | 5/1996 | Kobayashi et al. ............... 222/105 X |

FOREIGN PATENT DOCUMENTS

| A-0 024 263 | 8/1980 | European Pat. Off. . |
| 0 182 094 A3 | 5/1986 | European Pat. Off. . |
| A-0 444 990 A1 | 2/1991 | European Pat. Off. . |
| 0 550 772 A1 | 7/1993 | European Pat. Off. . |
| 1 314 002 | 11/1962 | France . |
| 45-31397 | 10/1970 | Japan . |
| 49-44629 | 11/1974 | Japan . |
| 55-66984 | 5/1980 | Japan . |
| 63-49371 | 4/1988 | Japan . |
| 2-59163 | 4/1990 | Japan . |
| 1104204 | 2/1968 | United Kingdom . |
| 8600868 | 2/1986 | WIPO ........................... 222/105 |

*Primary Examiner*—Kevin P. Shaver
*Attorney, Agent, or Firm*—Oliff & Berridge, P.L.C.

[57] ABSTRACT

A container and pump device is provided that allows interference in pumping action, caused by collapsing of an inner layer of the container during expulsion of fluid from within the container, to be eliminated. The container can be a laminated bottle having a mouth portion, a body, a bottom portion, and at least an inner layer and an outer layer. The pump device includes a suction portion inserted into the bottle and an operable portion exposed to an outside of the bottle. The suction portion is open to a lower end of the pump and includes a rod extending toward the bottom of the bottle. The rod has a cross-section that extends in more than two directions, preferably an I-beam with a centrally intersecting beam. The suction portion, including the rod, creates several fluid communication paths along the I-beam rod from the inner layer to the pump.

4 Claims, 34 Drawing Sheets

11  14  17

LAMINATED BOTTLE AND PUMP DEVICE THEREFOR

This is a Divisional of application Ser. No. 08/175,390 filed Feb. 1, 1994, now U.S. Pat. No. 5,513,761.

TECHNICAL FIELD

The present invention relates to a laminated bottle comprising at least two layers, and more particularly to a laminated bottle wherein an innermost layer may be freely peeled away from an outermost layer to form an independent inner bag, and a pump device designed for exclusive use for such a laminated bottle.

BACKGROUND TECHNOLOGY

A laminated bottle is known, wherein said bottle comprises at least an outer layer and an inner layer, said outer and inner layers being bonded together integrally over their whole surfaces so that these two layers may not be peeled away.

It has been sometimes experienced that a pressure inside the bottle may be reduced due to the evaporation of contents, such as, for example, an oxygen, long after the filling of the contents, even when the bottle is in a closed condition. Another type bottle is also known, wherein a pump is attached to a mouth portion of the bottle and said pump is actuated to expel the contents. In this type of bottle, the pressure inside the bottle may be reduced as the contents are being emptied by the pump.

In such a case, as shown in FIG. 56, there may arise a problem that the conventional laminated bottle may have its inner layer 1 and its outer layer 2, which is a principal body of the bottle, collapse and thereby deteriorating the product in its commercial value.

Moreover, said deformation may take place irregularly, and thus the contents may tend to build-up upon irregular portions on the inner layer created by deformation, even if the mouth portion is located to face downwardly, and thereby interfering with a metered and efficient removal of the contents.

It is a technical object of the present invention to prevent the outer shape of the bottle from being deformed, which would otherwise occur due to a reduced pressure inside the bottle.

DISCLOSURE OF THE INVENTION

The laminated bottle in accordance with the present invention has a construction as that to be described hereinbelow.

That is, the present invention provides a laminated bottle, said bottle comprising a bottle mouth portion formed at the upper portion of the body portion and a bottom portion at the lower portion of the body, said bottle being formed from at least two layers, i.e., an outer layer made from synthetic resin and an inner layer made from flexible synthetic resin, wherein the inner layer of said bottle body portion and an outer layer adjacent to the inner layer are formed to be freely peelable, and at least a portion of said inner layer and outer layer are bonded together by means of a bonding band, wherein said bonding band is provided longitudinally along a the bottle between said bottle mouth portion and the bottle bottom portion, one or more inner layers being bonded together at a rib on a bottom parting line to be formed in molding the bottle, one or more outer layers being formed so that they may form a slit through which air may flow between said outer layer and inner layer without allowing outer layers to contact each other, and a lock portion being provided on at least a portion of the bottom of said bottle for retaining said outer and inner layers integrally.

In the present embodiment, it is only required that the inner layer may be freely peeled away from the outer layer. Consequently, the number of inner and outer layers may be selected arbitrarily, as long as there are two or more layers.

By such a laminated bottle arrangement, any adverse effect may not be imposed upon the shape of the bottle for a longer period after contents are filled, when the volume of contents is reduced to lower the internal pressure inside the bottle or when the bottle internal pressure is reduced by emptying the content by a pump. This is because said inner layer is pulled to separate away from said outer layer under a negative pressure, and thus the inner layer may become an independent bag that may shrink and be deformed separate from the outer layer.

Complete removal of the content from the bottle with no residue is desired. However, a satisfactory result may not be derived from the shrinkage of the independent bag formed from the inner layer.

Thus, it becomes necessary to provide a restriction or control against the shrinkage of the inner bag. It is therefore an object of the present invention to provide means of physically controlling such shrinkage or a manner in which the inner layer may be collapsed.

Accordingly, the present invention provides a laminated bottle, said bottle comprising a bottle mouth at the upper portion of the bottle body and a bottom at a lower portion of the body, said bottle consisting of at least two layers i.e., an outer layer and an inner layer, wherein the inner layer of said bottle body and the adjacent outer layer are made to be freely peeled away from each other, and at least one of said inner layer and outer layer is bonded together by means of a bonding band, and wherein said bonding band is provided at the bottle body to run longitudinally from said bottle mouth portion toward the bottom portion.

When the bottle has an elliptical shape in cross-section, it is more preferable that the bonding band be provided on the body located at opposite ends of the major axis of the elliptic. Though at least one bond band is provided, a plurality of such bands may be selected.

The bottle is molded in accordance with a so-called Parison-blow process, but inner layers are bonded with each other at a rib on a bottom parting line to be formed during a molding step, while outer layers are not bonded with each other. Thus, a slit through which air can be withdrawn is formed between inner and outer layers. Described in more detail, it may appear that outer layers are bonded to each other temporarily during a molding step, but they may be easily cracked along the parting line, to form the slit, by pushing the parting line from the outside using a push-rod. In this way, it becomes possible to withdraw air as the inner layer is deformed, thereby preventing deformation of the outer layer which would otherwise occur due to a close contact between outer and inner layers.

Furthermore, the bottle is provided at least partially thereof with a lock portion that acts to integrally retain the outer and inner layers. Thus, because the bottom portion of the inner layer is locked against the bottom portion of the outer layer, when the bag made from the inner layer shrinks, the inner layer is not lifted-up at its bottom portion. Accordingly the bag made from the inner layer may be shrunk to a preferable configuration.

Moreover, if the bottom portion is lifted up to an interior of the bottle, a slit in the bottom portion may be spaced away from a floor surface upon which the bottle may be laid, thereby making it possible to prevent water flowing over the floor from entering into a space between outer and inner layers, for example, when the present bottle is used at a bath room.

Laminated parisons are made beforehand during the manufacture of the bottle. During this manufacture, a bonding layer is provided in a band-like configuration between inner and outer layers. Laminated parisons are sandwiched using a split die in which the bottle may be molded, and the bottle is produced by supplying air into the laminated parisons. After production, the slit is formed by impacting upon the bottom portion, which is carried out as above-described.

In the laminated bottle of the present invention, any adverse effect may not be imposed upon the shape of the bottle for longer periods of time after contents are filled, when the volume of content is reduced to lower the internal pressure inside the bottle, or when a pump is attached to the mouth portion to pour out the contents, because said inner layer is pulled away from said outer layer to be separated under a negative pressure, and only the inner layer may become an independent bag that may shrink and deform.

Additionally, a deformed configuration can be predetermined for the bottle when the inner layer is deformed by bonding the inner and outer layers at their particular portions beforehand, and thus it allows an easy and efficient removal of the contents from the bottle, even when the inner layer is deformed.

When inner and outer layers are bonded together at least partially by means of adhesive, and if a single length of bonding band is formed at least on the body portion longitudinally from the bottle mouth portion toward the bottom portion, the shrinkage of the bag which is formed from the inner layer at the bonding band may be restricted, and thereby allowing one to specify the deformation shape for achieving an efficient removal of the contents.

When the lock portion is provided at least partially on the bottom portion for retaining outer and inner layers integrally, the bag which is formed from the inner layer and which shrinks may not be lifted up thereby contributing much to an efficient removal of the contents.

The laminated bottle in accordance with the present invention is preferred for use in conjunction with a pump device which will be described hereinbelow.

Where the pump device having a suction pipe which depends into the bottle is attached to the laminated bottle of the present invention, as shown in FIG. 41, no problem will be encountered during an early stage of application, but as the volume of contents reduce, the bag made from the inner layer tends to intimately adhere to the suction pipe thereby interfering with the smooth flow of the contents and closing off the opened end of the suction pipe preventing removal of the content.

By allowing the bag made from the inner layer to intimately contact with the suction portion at the time of emptying, it becomes possible to prevent the contents which are present on the upper section of the bottle from falling down to the tip end of the suction pipe, and thus the contents may build-up upon the upper portion.

To solve such a problem, it is desirable to provide the pump device of such a construction as described hereinbelow.

That is, a pump device for a container, said pump comprising a suction portion which is inserted into the vessel to be opened up, and an operable portion which is exposed to the outside of the container, an area around said suction portion being enclosed by a bag in which the contents are contained and which is loaded into the container, wherein said suction portion is tubular in the first embodiment, and a concaved or convexed portion which extends in a longitudinal direction is formed on the circumferential surface thereof, wherein a plurality of suction holes are defined in the end of the suction portion, said suction holes being opened to a lateral surface.

In such a pump device, it may be probable that the bag, which has been shrunk, may enter into contact with the lower end portion of the suction portion and thereby be broken. Thus, it may be preferable to form the lower end surface of the suction portion in a curved configuration.

In this case, an annulus can be outfitted to an area closely adjacent to the base portion of the suction portion, and the annulus may be provided with a window that is parallel with its axis.

In the construction of the pump as above-described, the suction portion may be opened up at the lower end of the pump in a second embodiment, and the suction portion may comprise a rod which opens to the lower end of the pump to extend from an area in the vicinity of the suction portion. The rod may be constructed with such a cross-section in which sheets extend in two or more directions.

It may also be probable that this rod may come into contact with the lower end of the bag and be broken when the bag is shrunk, and so it would be preferable to form the rod in a curled configuration.

Furthermore, an annulus may be outfitted to a section which extends from the suction portion to the pump, and the annulus may be provided with a window that runs parallel to its axis.

It is also preferable that a tubular connecting portion may be provided at the suction portion itself for coupling with the pump, and a groove portion may be provided along a circumferential surface of this connecting portion so that the contents may flow therethrough.

In accordance with the first embodiment, a clearance is formed between the bag which is loaded into the container and the suction portion by means of a concaved or convexed portion which is provided on an area around the suction portion, and thus the bag does not intimately contact with the suction portion.

Any adverse effect may not be imposed upon the shape of the bottle for longer periods after contents are filled in the laminated bottle of the present invention when the volume of contents is reduced to lower the internal pressure inside the bottle or when the pump is attached to the mouth portion to empty the contents because said inner layer is pulled away from said outer layer and separated under a negative pressure. Thus the inner layer may become an independent bag which may shrink and deform. In such a case, the inner layer which corresponds with the bag to be peeled away does not intimately contact with the suction portion.

An oiling passage may thus be ensured even when the volume of the contents reduce and consequently, a substantially whole content can be discharged smoothly.

In the first and the second embodiments, it is possible to prevent the bag from being broken by forming the lower end of the suction portion or of the rod in a curved configuration, even if the shrunk bag may contact with the lower end.

Because the need of separately arranging an annulus can be eliminated by forming a connecting portion with the pump itself to be in the suction portion and by forming a longitudinal groove in the circumference of the connecting portion, the number of parts can be reduced.

BEST MODE FOR CARRYING OUT THE INVENTION

[Embodiments 1–5]

Figure 1:
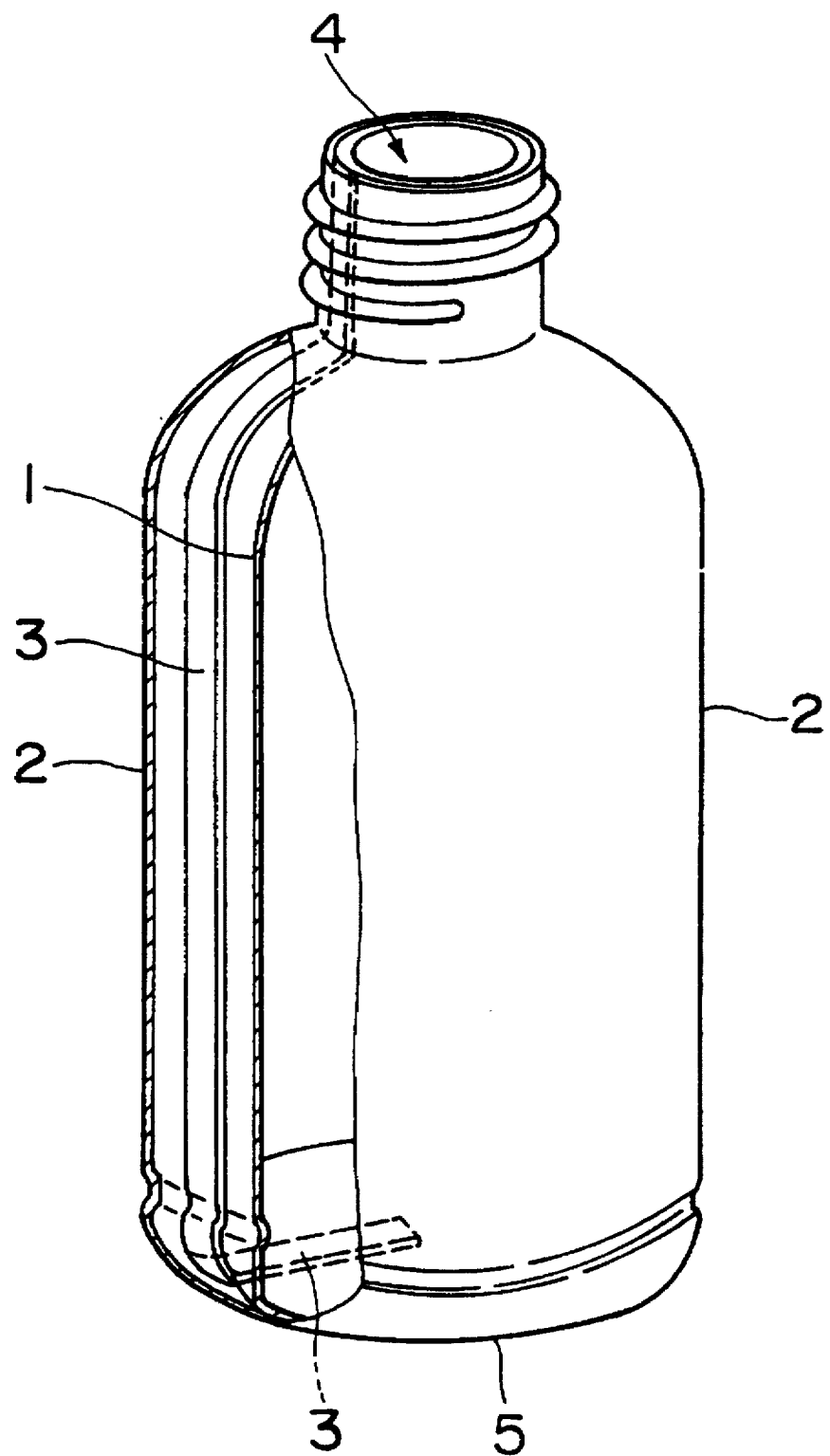
FIG. 1 is a pictorial view showing a laminated bottle in the first embodiment of the present invention.

FIG. 1 shows the first embodiment 1 of the present invention, wherein there is provided a laminated bottle, wherein said bottle consists of inner and outer layers 1 and 2, said bottle comprising a bottle mouth portion 4 at an upper portion of the body with circular or rectangular cross-section, and a bottom portion 5 at a lower portion of the body, said inner layer 1 and said outer layer 2 being bonded together partially. Said outer layer 2 is made from high-density polyethylene, and the inner layer 1 is formed from the nylon layer and a further inner resin layer. The bond layer 3 is formed from Admer (Trade Name).

Admer is an adhesive formulated from a modified polyolefin made by Mitsui Petrochemical Industry Co., Ltd. The inner layer 1 can form a bag for itself when it is peeled away from the outer layer 2.

The mouth portion 4 of the bottle is provided with a pump (not shown) through which contents may be discharged. A pipe is provided through which the contents are sucked such that the pipe may depend from the pump body toward a lower extremity of the bottle.

The material which may be used in the present invention has been selected initially from the high-density polyolefine (HD, PE) for the outer layer 2, and nylon for the inner layer 1. This arrangement may ensure a sufficient peeling between inner and outer layers, but it may not be embodied for normal contents since nylon has an increased water permeability. Thus, it may be advisable to use a further resin layer, for example, an Admer (Trade Name) layer 1a inside the nylon serving as an inner layer 1. If the thickness of the inner layer is excessive, the bottle is only slightly deformed at the shoulder when the contents are discharged through the pump, and the bottle may be fully collapse, resulting in an excessive residue amount of the contents. The thinner the inner layer thickness is, the faster the speed is at which the bottle is collapsed. This results in increased return speed of the pump and a smooth pump operation.

When the inner layer 18 was formed from a 50 μm nylon layer and the 50 μm Admer layer, a satisfactory result was obtained from the viewpoint of bottle collapse of the bottle and the amount of residues.

As shown in FIG. 1, the bonding layer 3 is provided to run vertically from the bottle mouth 4 to the bottle bottom portion 5 in a band-like configuration passing partially around the outer circumference of the inner layer 1, i.e., the inner circumference of the outer layer 2. By the arrangement, the outer and inner layers 2 and 1 are partially bonded together by bonding layer 3. That is, the outer layer 2 and the inner layer 1 can be peeled away form each other, except for the area bonded by bond layer 3. A single length of said bonding band is provided that runs longitudinally from the mouth portion to the body portion, and further to the bottom portion 5.

Figure 2:
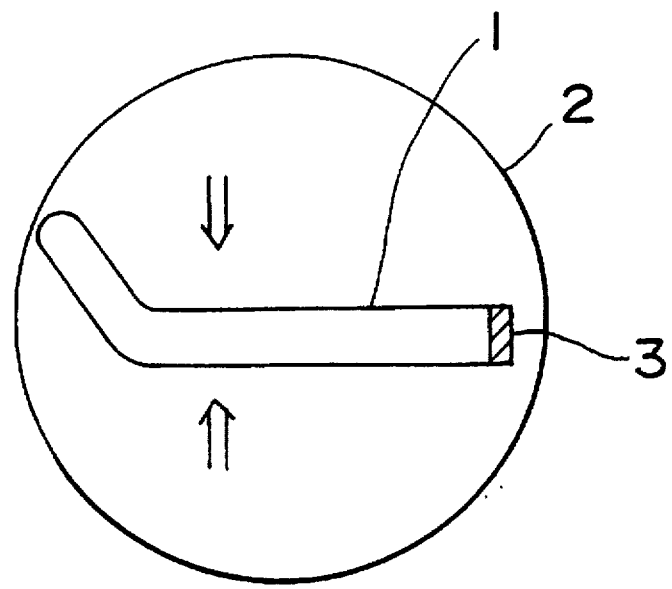
FIG. 2 is a cross-sectional view showing how the bag which is formed from the inner layer is collapsed when it is provided with a single bonding band.

When the outer layer 2 and the inner layer 1 are bonded together by the single length of bonding band in the above-described manner, the bag formed from the inner layer 1, which has been peeled away from the outer layer 2, as shown in FIG. 2 is stripped away uniformly from the outer layer 2 and is collapsed in a flat and clean manner at the central portion of the bottle.

Figure 3:
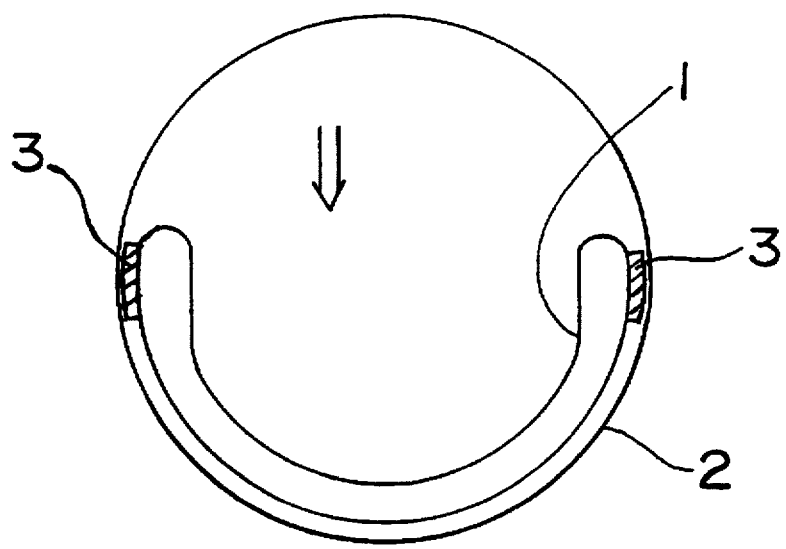
FIG. 3 is a cross-sectional view showing how the bag which is formed from the inner layer is collapsed when it is provided with two bonding bands in an opposing relationship.

On the contrary, when two lengths of bonding bands are provided in opposing relationship to each other and extending from the mouth portion 4 to the bottom portion 5 as shown in FIG. 3, the inner layer 1 may be peeled away initially to move toward its opposite surface an the opposite inner side of the bottle if one side surface on the inner layer is stripped, and the bag made from the inner layer 1 is caused to collapse. This occurs as a result of inconsistent wall thickness of the inner wall 1 (0.01–0.02 mm) and short and long circumferences due to offset of the two bonding bands. The layers are usually peeled away from the circumferential area of the thin wall thickness side, or a longer circumferential side. If the layer is collapsed in such a manner as above-described, the collapsed bag formed from the inner bag acts to push the suction pipe, which depends from the body, in a lateral direction, and thereby imposing an adverse effect even upon the cylinder piston of the pump body.

The bottle of the present invention is manufactured in the following sequence.

Figure 54:
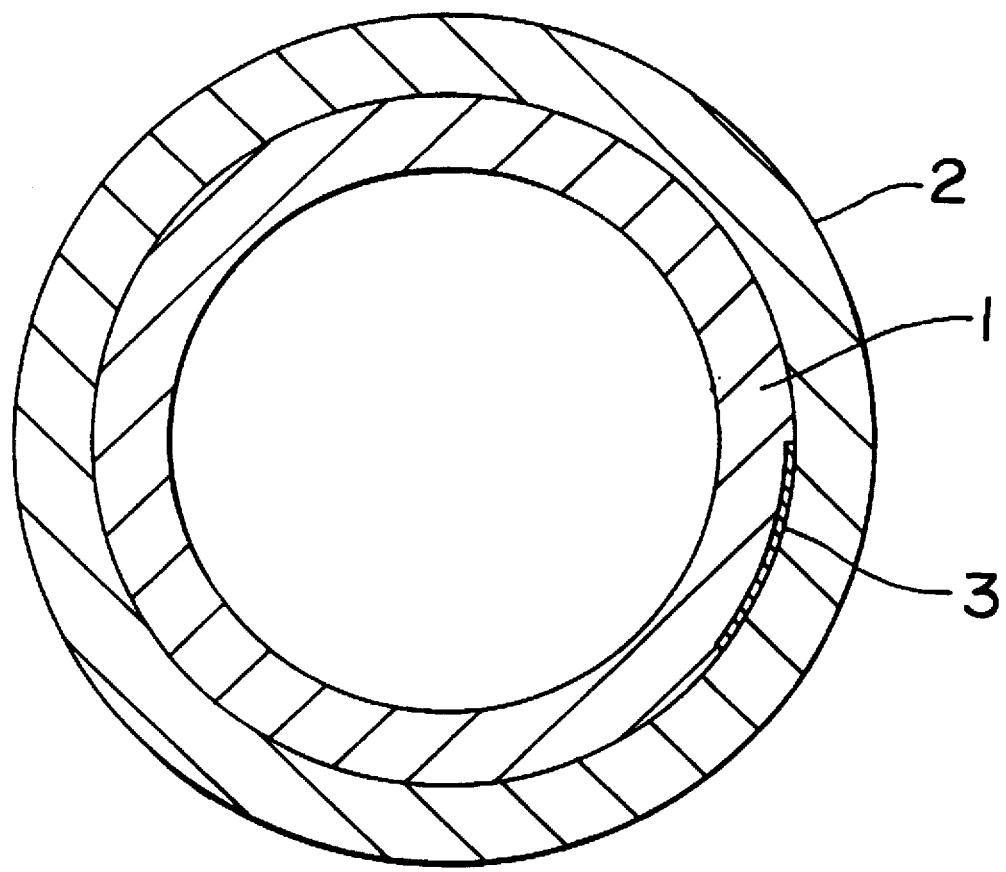
FIG. 54 is a cross-sectional view showing a laminated parison while the laminated bottle of the present invention is being manufactured.

First, laminated parisons having the cross-section as shown in FIG. 54 are injection molded. The bonding layer 3 is provided along the entire length of the laminated parisons. Then, the laminated parisons are sandwiched in position using a pair of blow-mold dies, and the bottle is formed in accordance with the Blow Molding Process as shown in FIG. 1.

That is, the laminated parison are sandwiched in position by means of a pair of blow molding dies and one end of the laminated parison is bitten off by means of die to provide a bottle bottom. The other end of the laminated parison is cut-off and then an air inserting core metal is inserted into the other end of the laminated parison. Air is supplied from the core metal into the laminated parison for form the product in accordance with the blow molding process.

Figure 4:
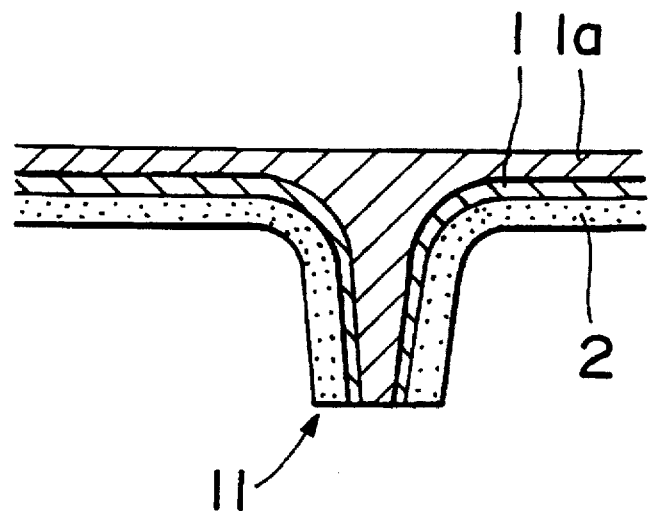
FIG. 4 is a cross-sectional view showing the rib (pinch-off portion) on the parting line on the bottle bottom portion.
Figure 5:
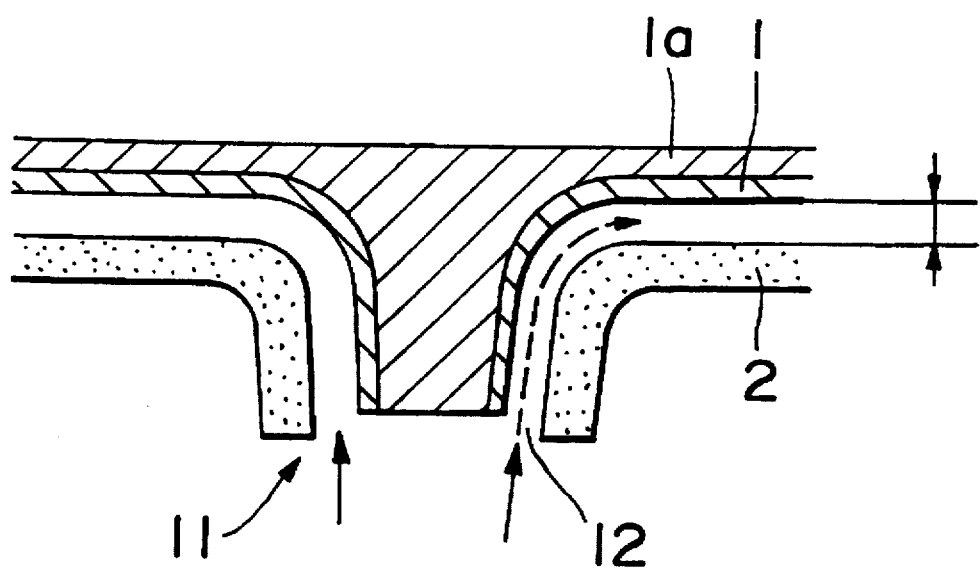
FIG. 5 is a cross-sectional view showing the rib (pinch-off portion) on the parting line on the bottle bottom portion and also illustrating the slit.

As described, the bottom surface of the bottle bottom is bitten off by means of die. This portion (pinch-off portion) which has been bitten-off lies on the parting line of the die. This biting-off produces a rib 11 which projects slightly upwardly. This rib which has been produced by bit-off is shown in FIG. 4 and FIG. 5. Inner layers 1 may contact with each other in this rib when they are bitten-off, whereas the outer layers 2 may not contact with each other. Thus, an area between the outer layer 2 and the inner layer 1 is caused to crack along the parting line to produce a slit 12, when the area is impacted by, for example, stamping the bottom surface with a rod or the like after the molding. As a result, an air is caused to flow into a gap between the inner layer 1 and the outer layer 2 passing through the slit 12.

Figure 6:
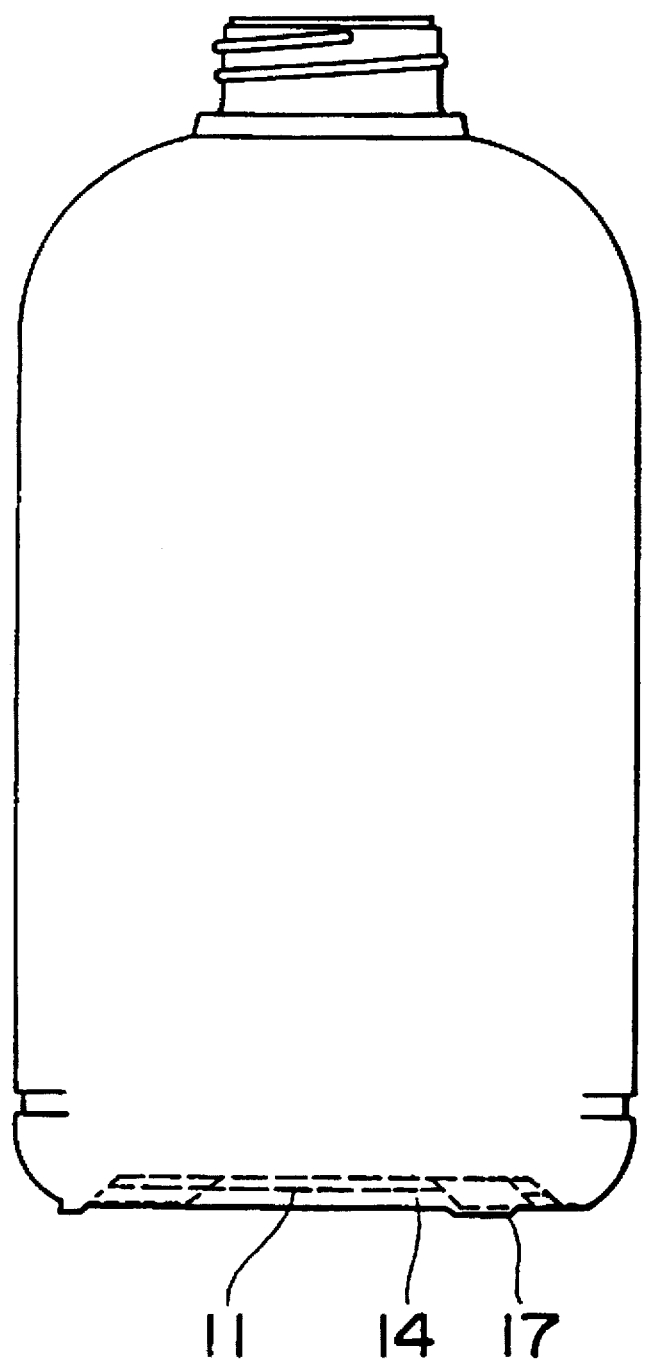
FIG. 6 is a front elevation of the laminated bottle according to the first embodiment.
Figure 7:
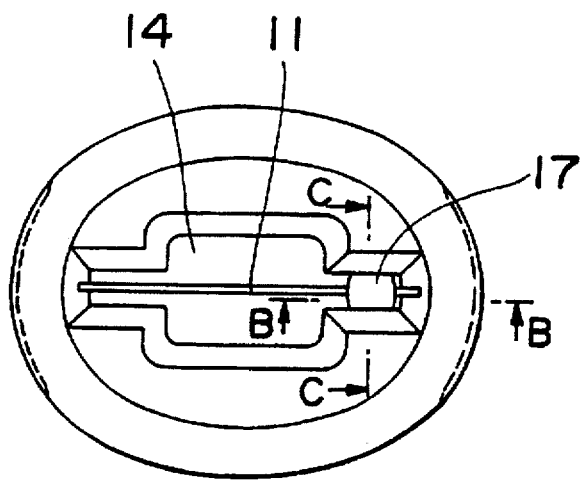
FIG. 7 is a bottom plan view of the laminated bottle according to the first embodiment.

Furthermore, the bottom surface is more recessed toward a inner side of the bottle at a portion where said slit 12 is produced, compared to a circumferential portion of the bottle. Thus, it may be most preferred to form the portion elevated from a lowermost extremity of the bottle bottom portion. When a recess 14 is formed at a central portion of the bottom as shown in FIG. 6 and FIG. 7, the recess 14 may be formed such that it may be transverse with the bottom portion 5 including the central bottom portion and a pair of parallel projection strips 15 may be left as it sandwiches this recess 14 therebetween, as shown in FIG. 14, FIG. 15, FIG. 16 and FIG. 17.

In FIG. 14, FIG. 15, FIG. 16 and FIG. 17, a pair of parallel projection strips are provided transverse to the parting line, retaining sub-recess 14 formed with the rib 11 sandwiched at a central portion of the bottom portion.

Figure 21:
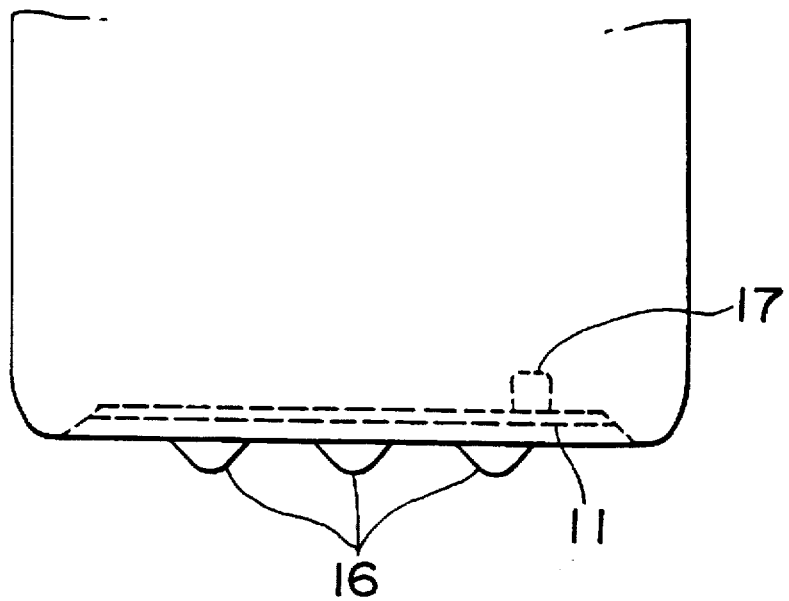
FIG. 21 is a bottom front elevation of the laminated bottle in the fifth embodiment.
Figure 22:
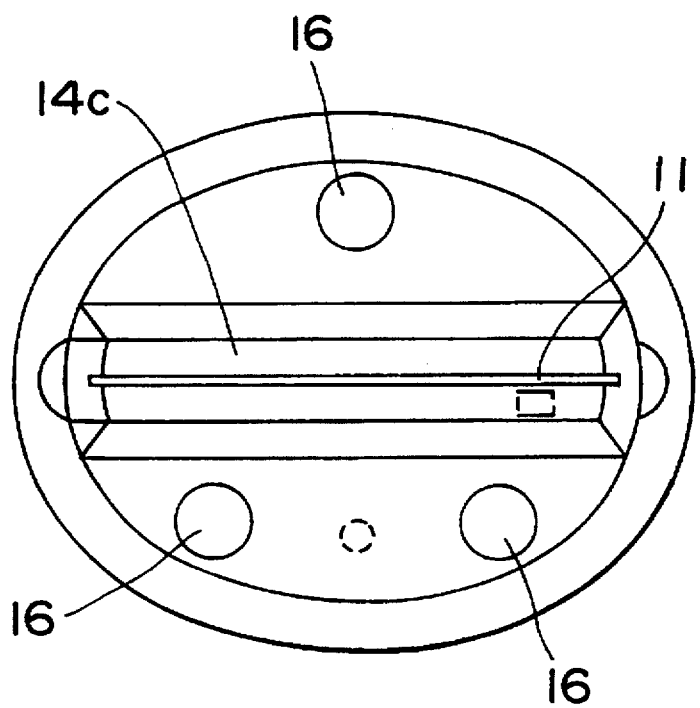
FIG. 22 is a bottom plan view of the laminated bottle in the fifth embodiment.

Illustrated in FIG. 21 and 22 is a construction, a recessed portion 14c is provided having the rib 11 centrally located therein and three legs forming a leg ledge 16 are provided on the surrounding bottom surface so that they may project outwardly therefrom. This leg ledge 16 may permit said slit portion 12 in the rib portion 11 to be elevated just in the same manner as that used for recessed portions 14a, 14b and 14c.

Specifically describing the embodiments shown in FIG. 14, FIG. 15, FIG. 16 and FIG. 17, said rib 11 (parting line) in which said slit may lie is provided in the major axis direction of the oblong configuration so that it may be transverse with the parting line running across the minor axis. A main recessed portion 14 may be present on the opposite ends of the major axis and a pair of parallel projecting portion 5 being remained on the recessed portion 14. Furthermore, a sub-recessed portion 14b is provided which is formed by further depressing the major recessed portion 14 and the projectile portion 15. The bonding band 3 lies on the parting line, whereas the band extends not only to the body of the bottle, but also to the central portion of the bottom portion 5.

Figure 14:
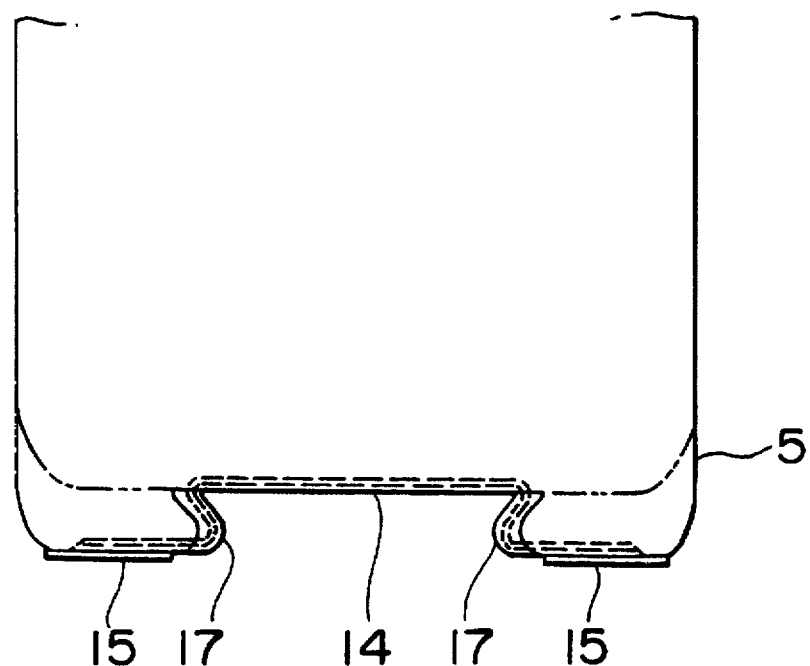
FIG. 14 is a bottom front elevation of the laminated bottle in the second embodiment.
Figure 15:
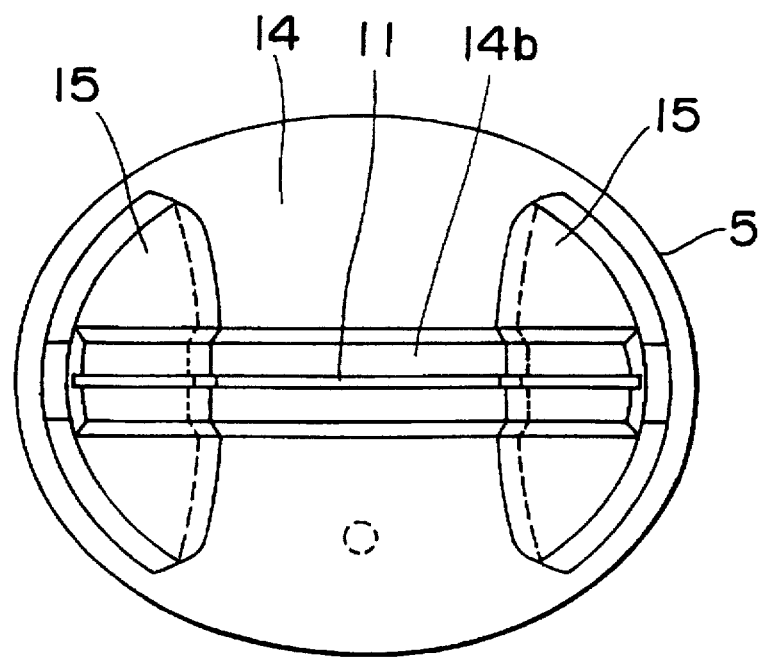
FIG. 15 is a bottom plan view of the laminated bottle in the second embodiment.
Figure 16:
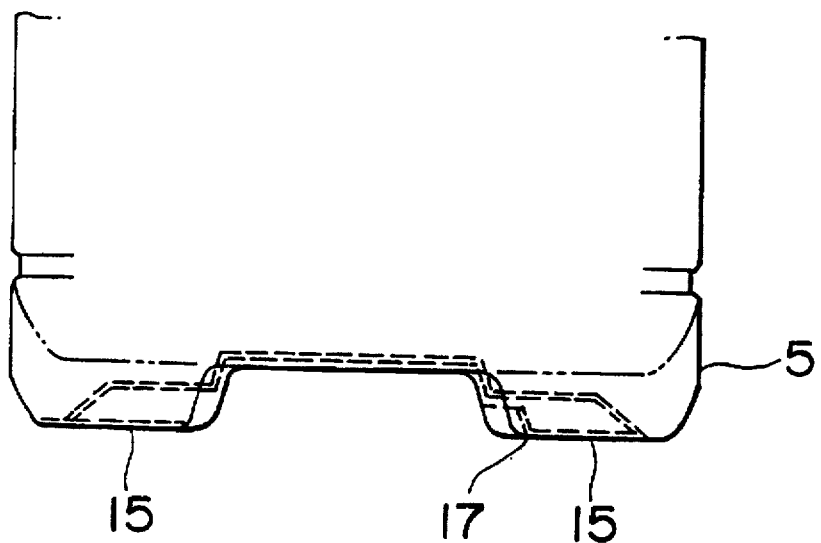
FIG. 16 is a bottom front elevation of the laminated bottle in the third embodiment.
Figure 17:
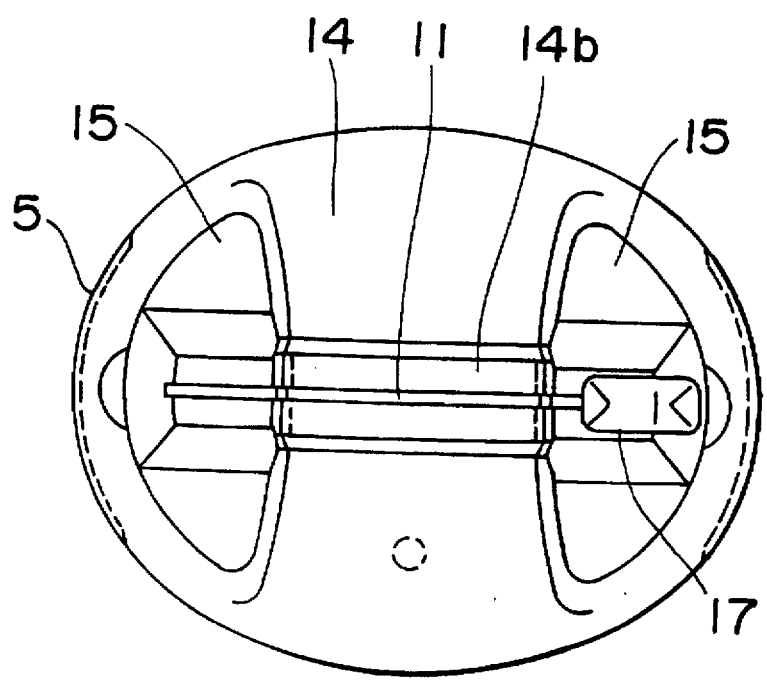
FIG. 17 is a bottom plan view of the laminated bottle in the third embodiment.
Figure 18:
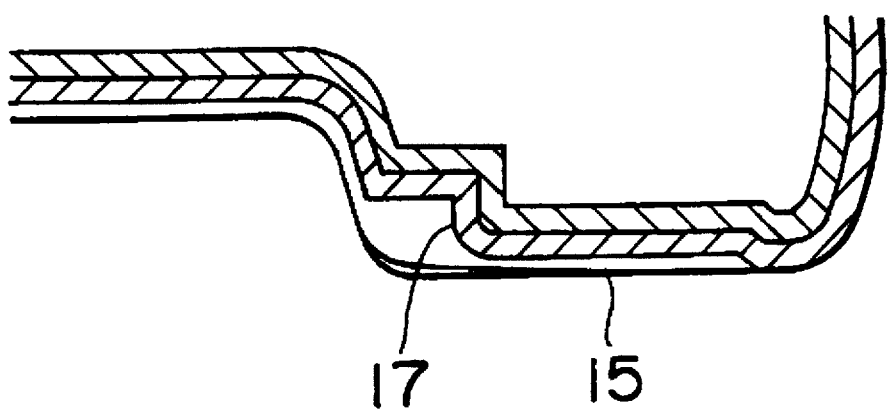
FIG. 18 is a cross-sectional view of the lock portion of the laminated bottle in the third embodiment.

In the case of FIG. 14, an interface between the projecting portion 15 and the main recessed portion 14 is formed in an overhanging configuration. This overhanging portion may allow the inner layer to be overhung against the outer layer to thereby form a lock portion 17.

Figure 8:
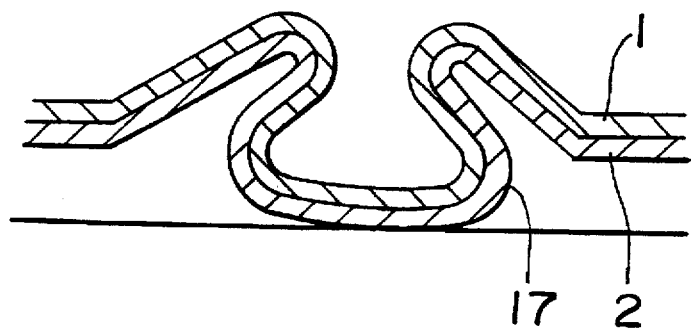
FIG. 8 is a cross-sectional taken view along the line C—C in FIG. 7.
Figure 9:
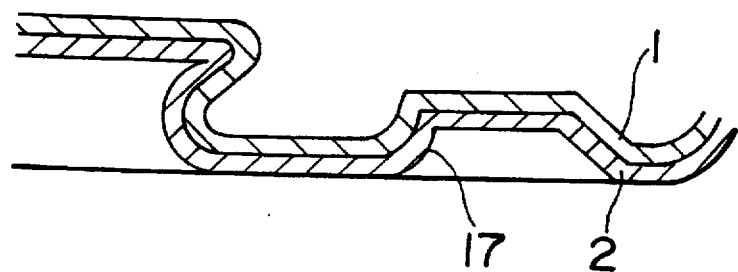
FIG. 9 is a cross-sectional taken view along the line B—B in FIG. 7.
Figure 19:
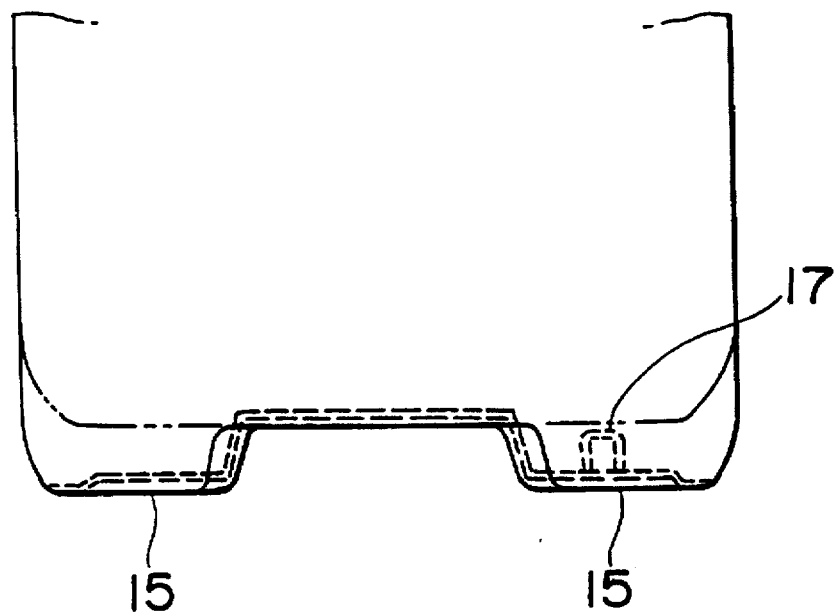
FIG. 19 is a bottom front elevation of the laminated bottle in the fourth embodiment.
Figure 20:
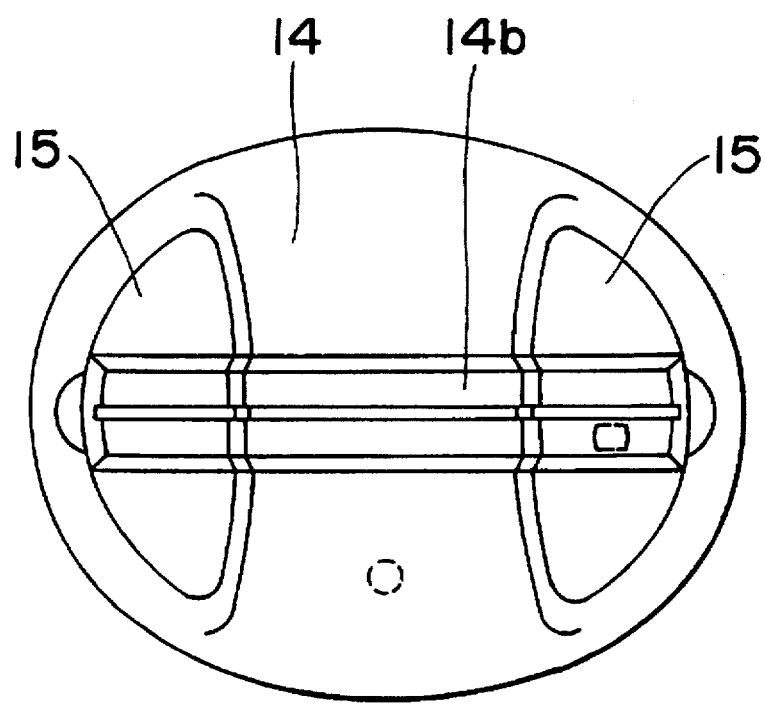
FIG. 20 is a bottom plan view of the laminated bottle in the fourth embodiment.

Moreover, in order to provide a lock portion which can be used to lock the inner layer with the outer layer, it can be suggested by way of example to provide a convexed lock portion 17 with a C-shaped cross-section in which the projecting portion 15 is projected outwardly as shown in FIG. 8 and FIG. 9, or alternatively a concaved lock portion 17 of a C-shaped cross-section as shown in FIG. 19 and FIG. 21. These concaved or convexed portions may be formed with an overhanging configuration in cross-section so that the inner layer may overhang with the outer layer at the overhanging portion.

This lock portion is preferably provided on the projecting strip portion 15 which is opposite the bonding band because this location allows users to adjust the collapse of the bag by the inner layer. That is, the bonding band 3 is arranged to lie along the left side of the drawing in each of embodiments shown in FIG. 6, FIG. 7, FIG. 10, FIG. 14, FIG. 15, FIG. 16, FIG. 17 and FIG. 19 to FIG. 22.

Figure 10:
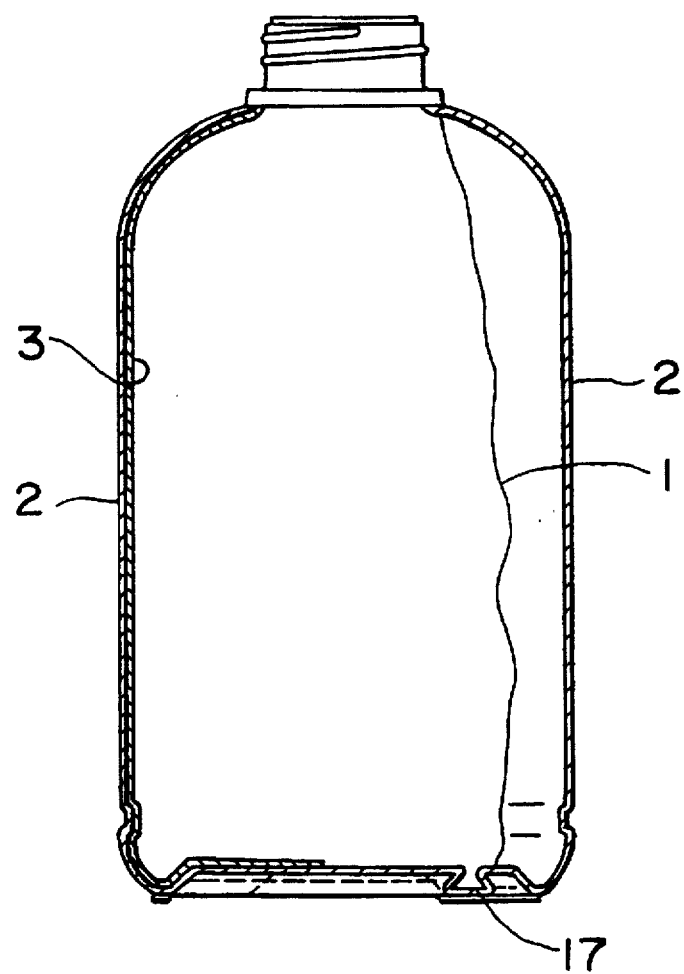
FIG. 10 is a front elevation showing how the bag which is formed from the inner layer is collapsed.
Figure 11:
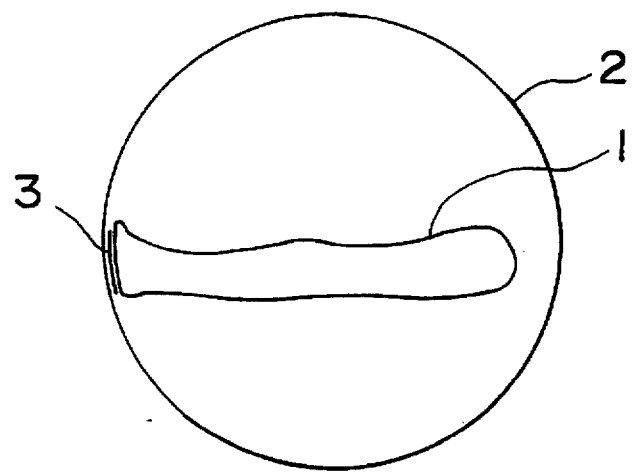
FIG. 11 is a cross-sectional view showing how the bag which is formed from the inner layer is collapsed.
Figure 12:
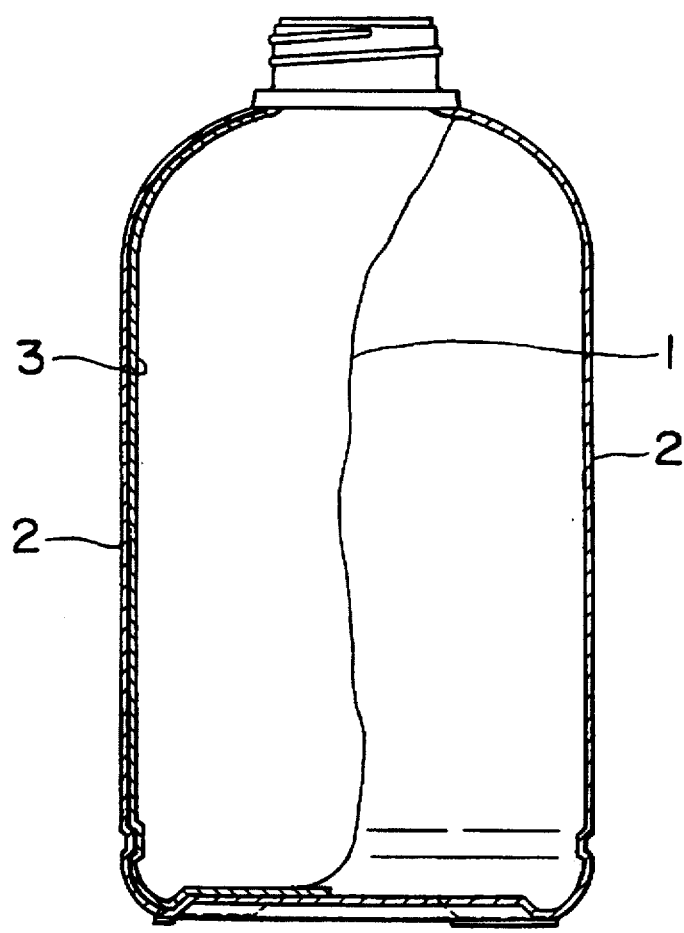
FIG. 12 is a front elevation showing how the bag which is formed from the inner layer is collapsed in the bottle without a lock portion.
Figure 13:
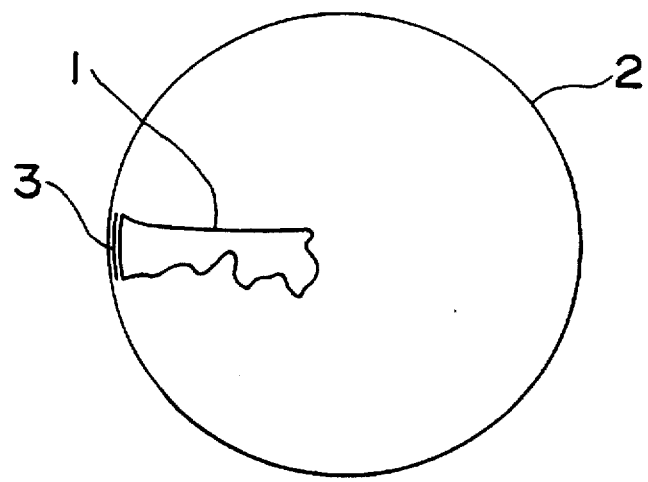
FIG. 13 is a cross-sectional view showing how the bag which is formed from the inner layer is collapsed in the bottle without a lock portion.

In cases where the lock portion 17 is present, the inner layer is locked in position on the bottom portion 5 and a consistent width may be maintained as shown in FIG. 10 and FIG. 11 when the inner layer is caused to collapse. In turn, in the absence of the lock portion 17, the bag which consists of the inner layer may be shifted in a lateral direction as shown in FIG. 12 and FIG. 13, and may urge the pump, etc., thereby interfering with the smooth emptying operation of the contents.

After being molded, a trimmer treatment is applied over the mouth portion in order to finish the mouth portion. During this trimmer process, a grinding and cutting trimmer is operated to rotate for removal of burrs from the mouth portion. However, the inner layer 1 is in close contact with the outer layer 2. Therefore, the inner layer 1 cannot be separated away from the outer layer 2 to prevent its entanglement around the trimmer by the mere rotation of the trimmer.

Thus, the mouth portions of the outer and inner layers may be finished uniformly.

Figure 55:
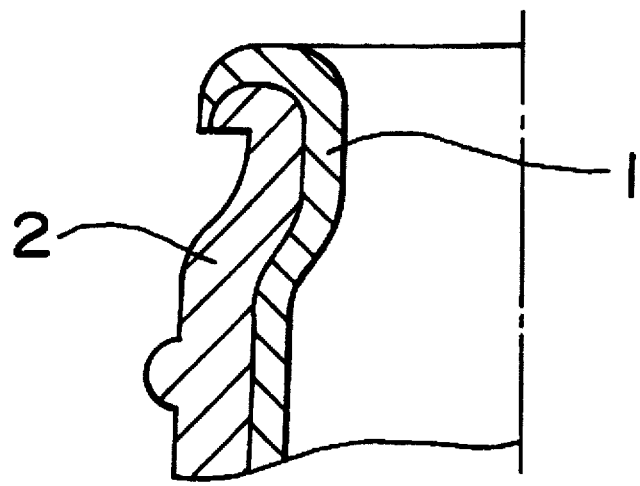
FIG. 55 is a view explaining the mouth structure of the traditional laminated bottle.
Figure 56:
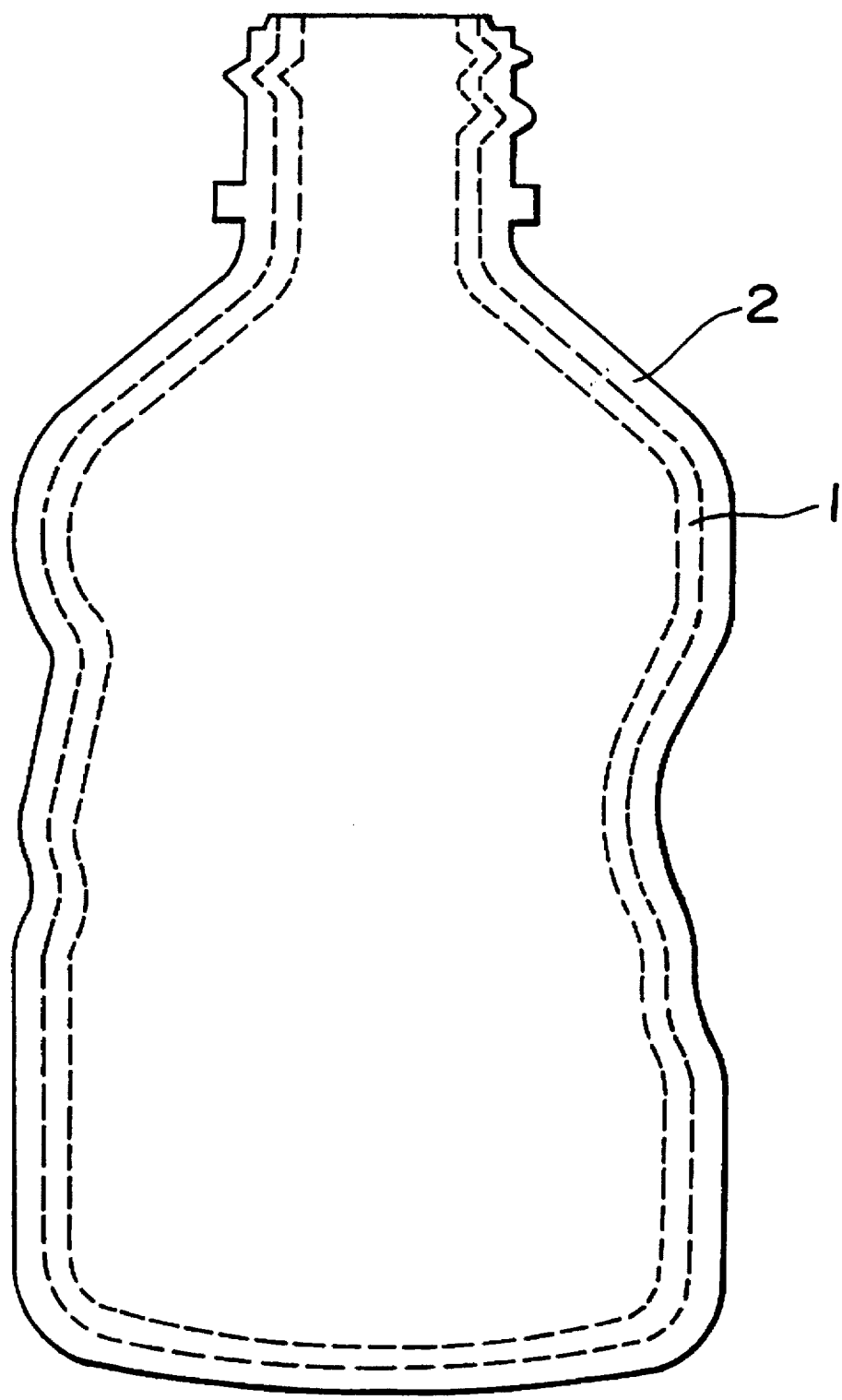
FIG. 56 is a view explaining the deformed state of the traditional laminated bottle.

As a finishing technique for the mouth portion of the bottle which can be carried out during the molding step, prior arts are known from U.S. patent application Ser. No. 103624 filed on January 1971 and Japanese Patent Application Unexamined Publication No. SHO.45-31397. These arts use a mandrel which is inserted into the mouth portion and a sleeve which is provided around the mandrel to finish the mouth portion. When this mandrel is inserted into the mouth portion of a bottle which contains freely peelable dual layers, the inner layer can be trailed along together with the mandrel. Thus it has been a conventional practice of overlapping the upper surface of the outer layer 2 with the inner layer 1 at the mouth portion to prevent the inner layer from being trailed in a downward direction, as shown in FIG. 55. Because these inner and outer layers are bonded together at the mouth portion in the bottle of the present invention, it is unnecessary to form the inner layer in such a configuration as that shown in FIG. 55. Thus, the bottle can be easily molded.

The bottle is suitable for use, wherein it is adapted to empty the liquid contents by means of a pump, by attaching the pump to the mouth of the bottle. For example, the bottle may be suitable for use as a large-sized container for shampoo or rinse to be used in the bath room.

In such a container as above-described, the inner layer may be peeled away from the outer layer and collapsed, upon the pump being actuated to produce a negative pressure inside the container. In such a case, air may enter into the clearance to be created between the inner and outer layers to prevent the collapse of the container made from the outer layer. In the meantime, such a large-sized container for shampoo or rinse is usually put on the floor surface in the bath room, and therefore hot water may enter into the outer layer through the slit 12 if such slit is provided at a position where the hot water may flood. However, in this embodiment, since the recessed portion 14 is provided so as to segregate the slit 12 away from the floor surface, there may be no chance of the hot water being sucked through the slit.

In the meantime, it may be preferable to provide for means that may mechanically push the bottle from the bottle bottom outer periphery toward the bottle lower side portion, in addition to a pushing operation to be applied against the pinch-off portion (ribbed portion), in order to facilitate the peeling of the inner layer and hence the inflow of the air at the bottom portion of the bottle.

[Embodiment 6]

The laminated bottle of the present invention can be preferably used in combination with a pump device to be described later. The pump device is one which is adapted to prevent a bag which is formed from an inner layer from making a close contact with a suction portion 34 at the time of delivery, or ensuring a flow passage of the contents in the bag and thereby facilitating the delivery of contents, even if the bag should contact closely with the suction portion 34, when the laminated bottle of the present invention is attached with a pump device which comprises a suction pipe depending into the bottle.

In the meantime, the construction of the pump itself, which is provided at the cylindrical mouth portion 2 of the container 1, is the same as that in the prior art, and therefore its detailed description is omitted.

Figure 23:
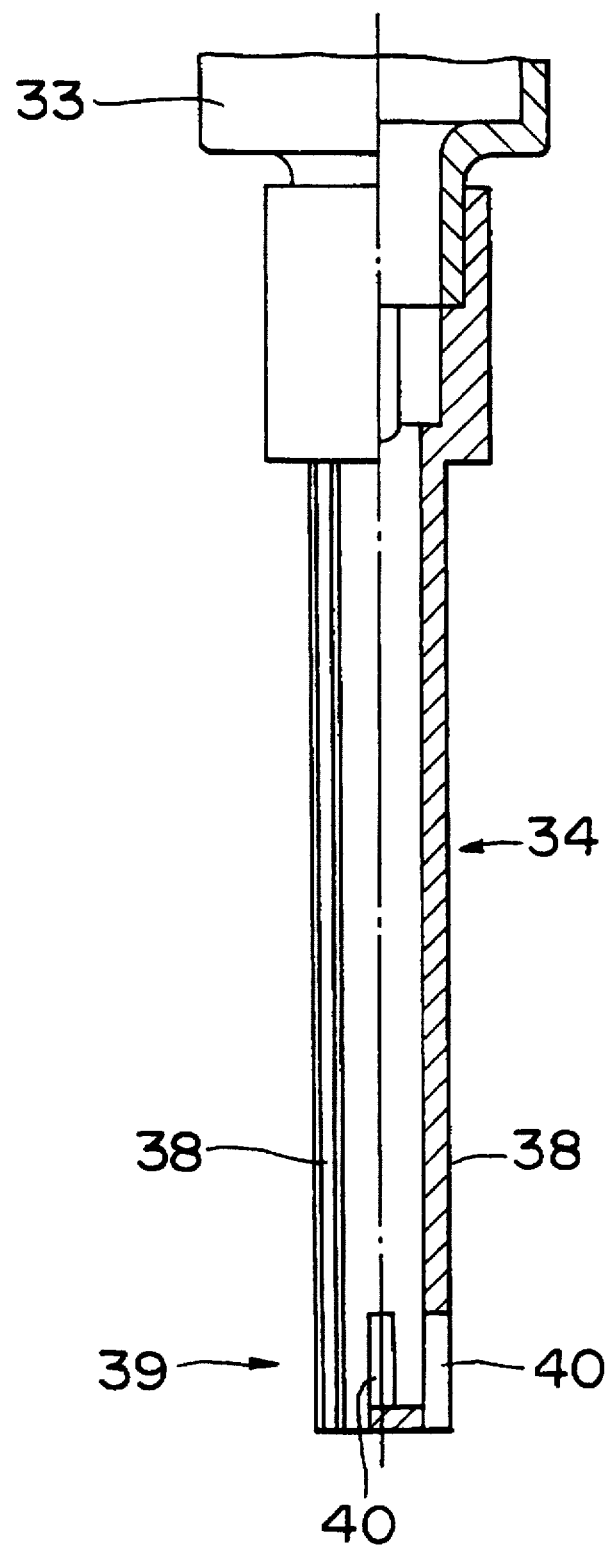
FIG. 23 is a partial cross-sectional view of essential parts of the pump device in the sixth embodiment.
Figure 24:
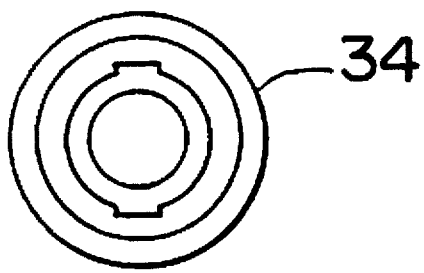
FIG. 24 is a plan view of the pump device in the sixth embodiment.
Figure 25:
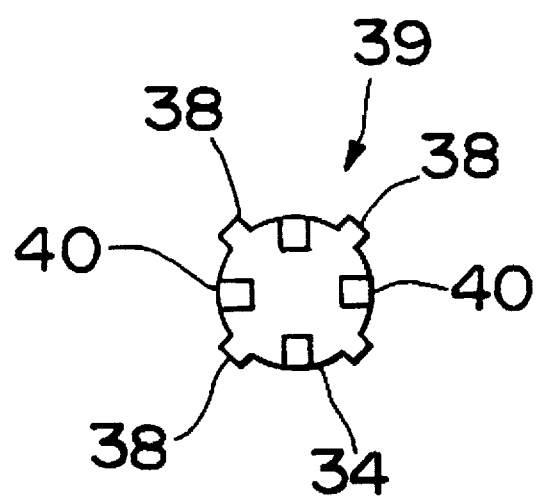
FIG. 25 is a bottom plan view of the pump device in the sixth embodiment.

This pump device comprises a suction portion 34 which is provided at the lower end of the pump 33, as shown in FIG. 23–FIG. 25, and is provided at the upper end of the pump with an operable portion (not shown) for the pump 33. The container can use the laminated bottle which has been described in each of above-embodiments. The suction portion 34 is inserted into the bottle, and the suction portion 34 is covered by the bag 1 made from the inner layer. The bag 1 is filled with contents.

In the meantime, when this pump device is used with the laminated container, even if the inner layer of two layers, i.e., outer and inner layer, abuts with the above-described bag 1, and the inner layer closely contacts with the suction portion 34, a flow passage through which contents are sucked can be reliably established to deliver the contents.

A ribbed convex portion 38 is formed to run in the longitudinal direction of the suction portion 4 along its peripheral portion. Four of such convex portions 38 are provided with 90° angular space therebetween. Then, four suction ports 40 are formed in the end 39 which lies below the suction portion 34, each of these suction ports being open to the lateral side of the suction portion 34. The four suction ports 40 are provided with 90° space between said convexed portion 38. The suction ports 40 each are formed in the configuration of a slit with the dimension of 1.5 mm in width and 10 mm in length. This suction port 40 is further open to the bottom surface of the suction portion 34.

In this embodiment, the suction portion 34 has the overall length of 110 mm and the outside diameter of 11 mm, whereas the convexed portion 38 has the height of 1 mm.

The convexed portion 38 may alternatively be formed in a concave configuration. That is, any construction can be employed, provided that a flow passage may be ensured into which the contents may drop by the presence of concave or convex portions along the suction portion 34, even if the bag 1 should contact closely with the outer periphery of the suction portion 34. In this way, the whole quantity of contents can be smoothly and reliably discharged.

An experiment carried out to compare the residue amount and remaining percentage of the contents indicated that the residue amount was 36.95 g and the residue percentage was 6.93% respectively.

[Embodiment 7]

Figure 27:
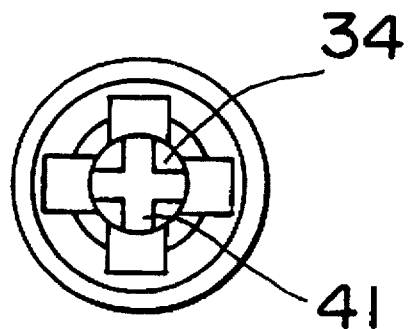
FIG. 27 is a plan view of the pump device in the seventh embodiment.
Figure 28:
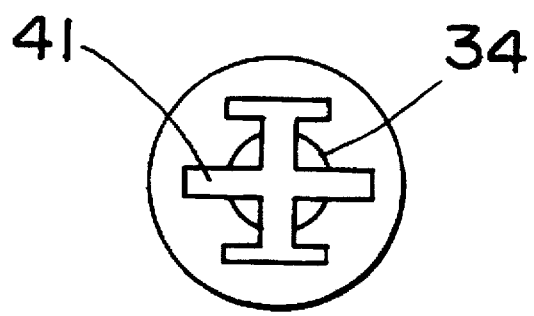
FIG. 28 is a bottom plan view of the pump device in the seventh embodiment.

The seventh embodiment of the present invention will be described with reference to FIG. 26 through FIG. 28.

In this embodiment, the suction portion 34 is formed in the configuration of a circular orifice portion with a diameter of 7 mm which opens at the lower end of the pump 33, rather than being formed in a cylindrical configuration. A rod 41 co-axial with this suction portion 34 extends to a position where it may not cover the suction portion 34. The rod 41 is formed by combining the sheet members into a cross-section of the Japanese word 王 and the center of the rod 41 coincides with the center of said suction portion 34. In other words, as shown in FIG. 28, rod 41 has an I-beam cross-section with a centrally intersecting beam. The rod 41 has a length of 91 mm, and an intermediate lateral line of the 王-shaped section has a width of 13 mm, and a thickness of 2 mm. In turn, the lateral line which lies vertically has a width of 7 mm and a thickness of 1.5 mm. Furthermore, a distance between lateral lines which lie in the vertical direction is set to be 9 mm. In the pump device in accordance with this embodiment, the rod 41 may interfere with the bag which has been shrunk, preventing it from closing off the suction portion 34, because the rod 41 lies immediately below the opening which is the suction portion 34, upon the bag being shrunk. Furthermore, a flow passage into which the contents flows may be provided by a clearance, i.e., a space to be created between sheet materials which form the rod 41. Consequently, the contents may not left behind as a residue even if the bag has been shrunk.

An experiment which was carried out to compare the residue amount and remaining percentage of the contents indicated that the residue amount was 35.0 g and the residue percentage was 6.78% respectively.

[Embodiment 8]

Figure 30:
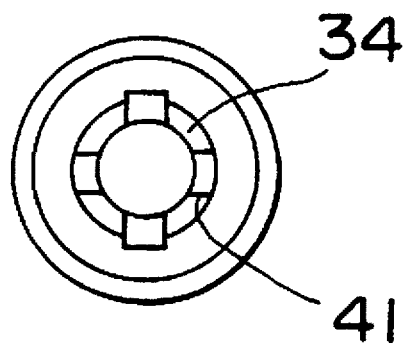
FIG. 30 is a plan view of the pump device in the eighth embodiment.
Figure 31:
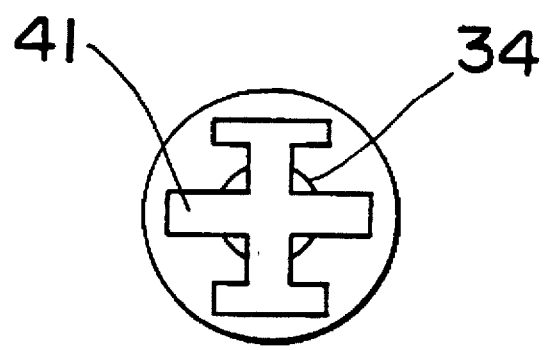
FIG. 31 is a bottom plan view of the pump device in the eighth embodiment.

The eighth embodiment of the present invention will be described, with reference to FIG. 29–FIG. 31. The suction portion 34 is not cylindrical, but is formed in the configuration of an orifice having a diameter of 7 mm that opens at the lower end of the pump 33, like in the embodiment 13. A rod 41 co-axial with the suction portion 34 extends to a position where it does not cover the suction portion 34.

The rod 41 is formed in a cross-section of the Japanese word 王 and the center of the rod 41 coincides with the center of said suction portion 34. The rod 41 has a length of 91 mm and an intermediate lateral line of the 王-shaped section has a width of 14 mm and a thickness of 3 mm. In turn, the lateral line which lies vertically has a width of 8 mm and a thickness of 2 mm. Furthermore, a distance between lateral lines which lie in the vertical directions is set to be 10 mm.

An experiment carried out to compare the residue amount and remaining percentage of the contents indicated that the residue amount was 28.9 g and the residue percentage was 5.75% respectively.

[Embodiment 9]

Figure 33:
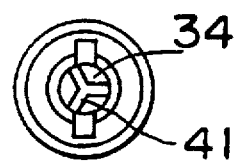
FIG. 33 is a plan view of the pump device in the ninth embodiment.
Figure 32:
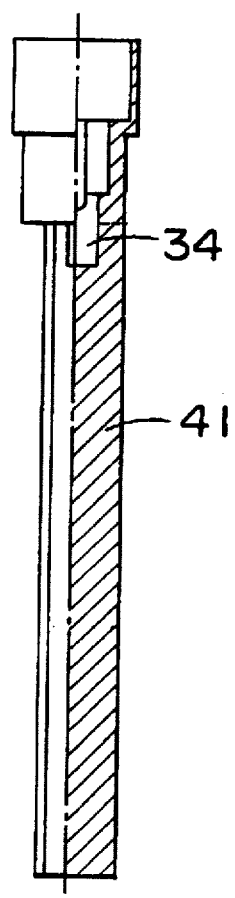
FIG. 32 is a partial cross-sectional view of essential parts of the pump device in the ninth embodiment.
Figure 34:
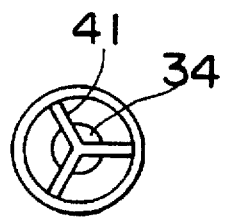
FIG. 34 is a bottom plan view of the pump device in the ninth embodiment.

The ninth embodiment of the present invention will be described hereinbelow, with reference to FIG. 32–FIG. 34.

In this embodiment, the suction portion 34 is formed as a circular orifice portion that is open at the lower end of the pump 33 and has a diameter of 7 mm, rather than a cylindrical configuration, just in the same manner as that in the previous embodiment. A rod 41 is co-axial with this suction portion 34 and extends to a position where it does not cover the suction portion 34.

The rod 41 is formed in the configuration, wherein three sheets are combined with each other having a 120° angular difference therebetween, having the rod's center coincide with the center of said suction portion 34. The rod 41 has a length of 91 mm, a width of 8 mm for every sheet and a thickness of 1.5 mm.

An experiment carried out to compare the residue amount and remaining percentage of the contents indicated that the residue amount was 116.11 g and the residue percentage was 22.90% respectively.

[Embodiment 10]

Figure 36:
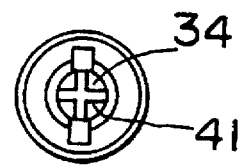
FIG. 36 is a plan view of the pump device in the tenth embodiment.
Figure 35:
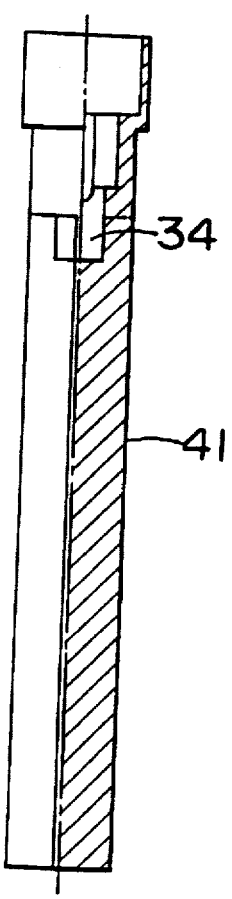
FIG. 35 is a partial cross-sectional view of essential parts of the pump device in the tenth embodiment.
Figure 37:
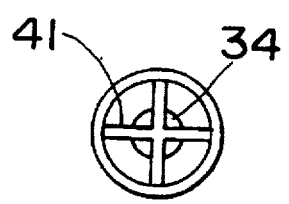
FIG. 37 is a bottom plan view of the pump device in the tenth embodiment.

The tenth embodiment of the present invention will be described hereinbelow, with reference to FIG. 35–FIG. 37.

In this embodiment, the suction portion 34 is formed as a circular orifice portion that is open at the lower end of the pump 33 and has a diameter of 7 mm, rather than a cylindrical configuration, just in the same manner as that in the eighth embodiment. A rod 41 is co-axial with this suction portion. 34 and extends to a position where it does not cover the suction portion 34.

The rod 41 is formed in a configuration wherein four sheets are combined in the shape of a crusade, having its center coincide with the center of said suction portion 34. The rod 41 has a length of 91 mm, a width of 8 mm for every sheet and a thickness of 1.5 mm.

An experiment which was carried out to compare the residue amount and remaining percentage of the contents indicated that the residue amount was 81.86 g and the residue percentage was 16.13% respectively.

[Embodiment 11]

Figure 39:
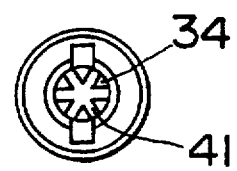
FIG. 39 is a plan view of the pump device in the eleventh embodiment.
Figure 38:
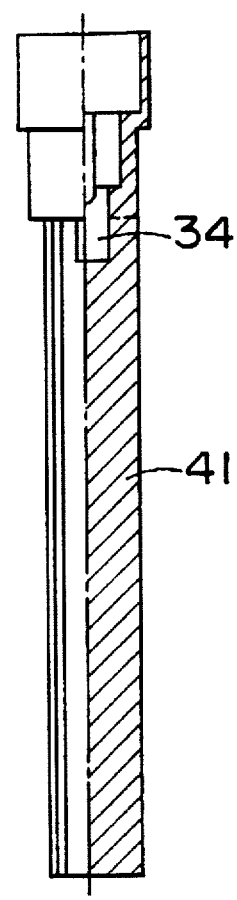
FIG. 38 is a partial cross-sectional view of essential parts of the pump device in the eleventh embodiment.
Figure 40:
FIG. 40 is a bottom plan view of the pump device in the eleventh embodiment.
Figure 41:
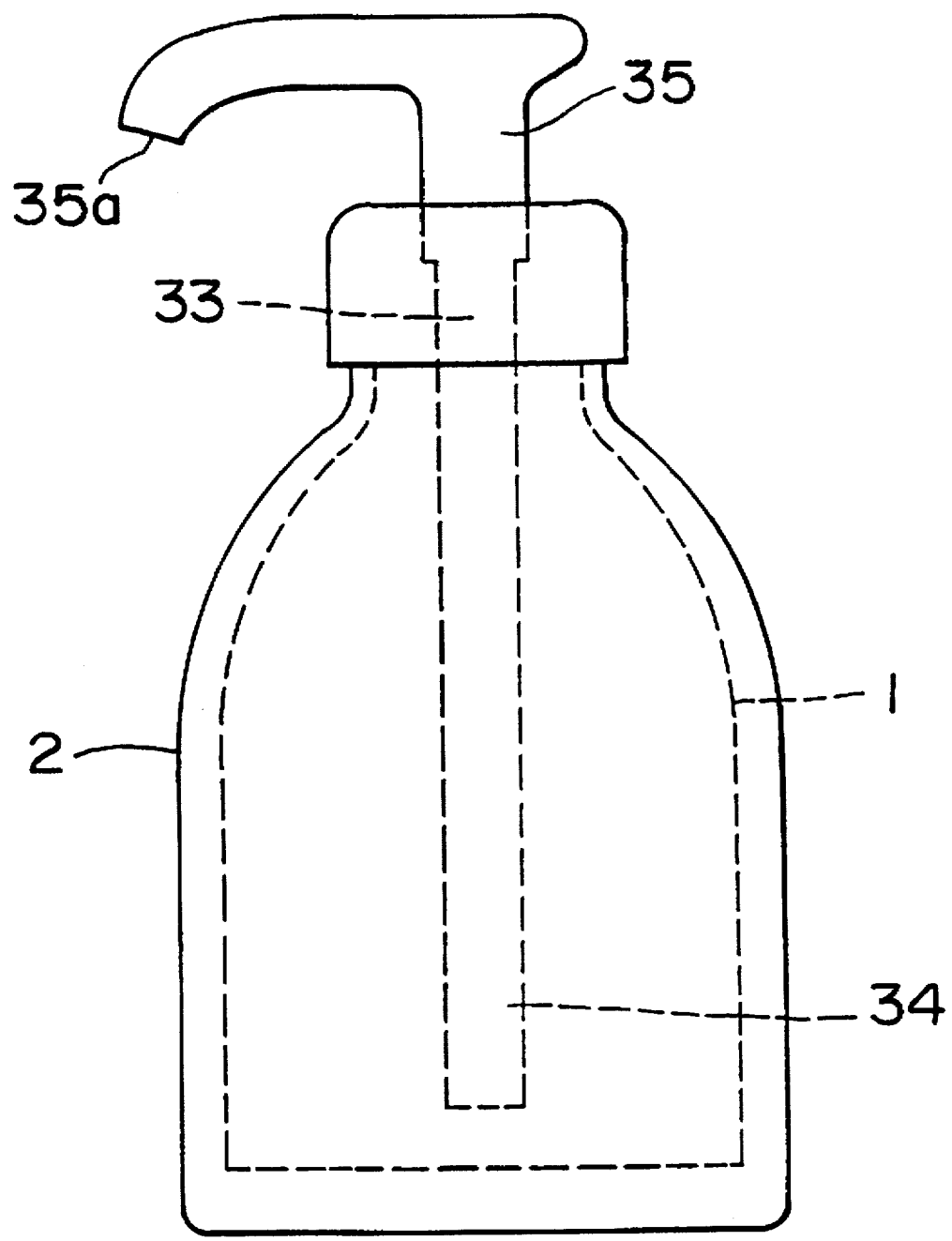
FIG. 41 is a side view Showing the container with the pump.

The eleventh embodiment of the present invention will be described, with reference to FIG. 38–FIG. 40.

In this embodiment, the suction portion 34 is formed as a circular orifice portion which is open at the lower end of the pump 33 and has the diameter of 7 mm, rather than a cylindrical configuration, just in the same manner as that in the previous embodiment. A rod 41 is co-axial with this suction portion 34 and extends to a position where it does not cover the suction portion 34.

The rod 41 is formed in such a configuration, wherein three sheets are combined with an angular difference of 120°, further combining narrower sheets with an angular difference of 60°, said narrower sheets being combined with the angular difference of 120°.

The center of the rod coincides with the center of said suction portion 34. The rod 41 has a length of 91 mm with the width of wider sheets of 8 mm, whereas the narrower sheet has a width of 5.1 mm and a thickness of 1.5 mm.

An experiment carried out to compare the residue amount and remaining percentage of the contents indicated that the residue amount was 37.97 g and the residue percentage was 7.47% respectively.

In the pump device of the present invention as above-described, a space is formed between a bag and the suction portion, and thus it is possible to prevent the bag from making a close contact with the suction portion, and thereby allowing the contents to be delivered smoothly and totally.

[Embodiment 12]

Figure 42:
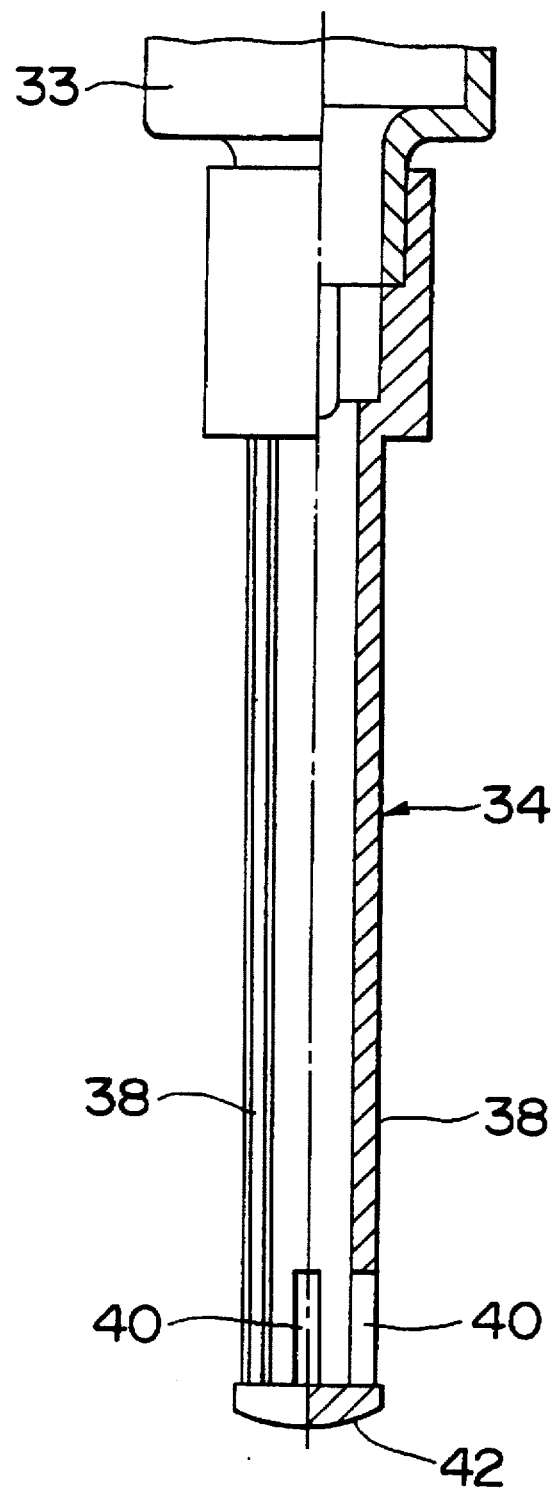
FIG. 42 is a partial cross-sectional view of essential parts of the pump device in the twelfth embodiment.

In the pump device as shown in the sixth embodiment of the present invention, the bag which has been shrunk may contact with and be broken by the lowermost end of the suction portion which is formed in a cylindrical configuration. Therefore, it is preferable to form the lower end portion of the cylindrical suction portion 34 in a convexed and curved configuration 42 as illustrated in FIG. 42. Except that the cylindrical suction portion 34 is formed at its lower end portion in the curved configuration as above described, the construction of the pump device is identical with that in the embodiment shown in FIG. 23.

[Embodiment 13]

Figure 26:
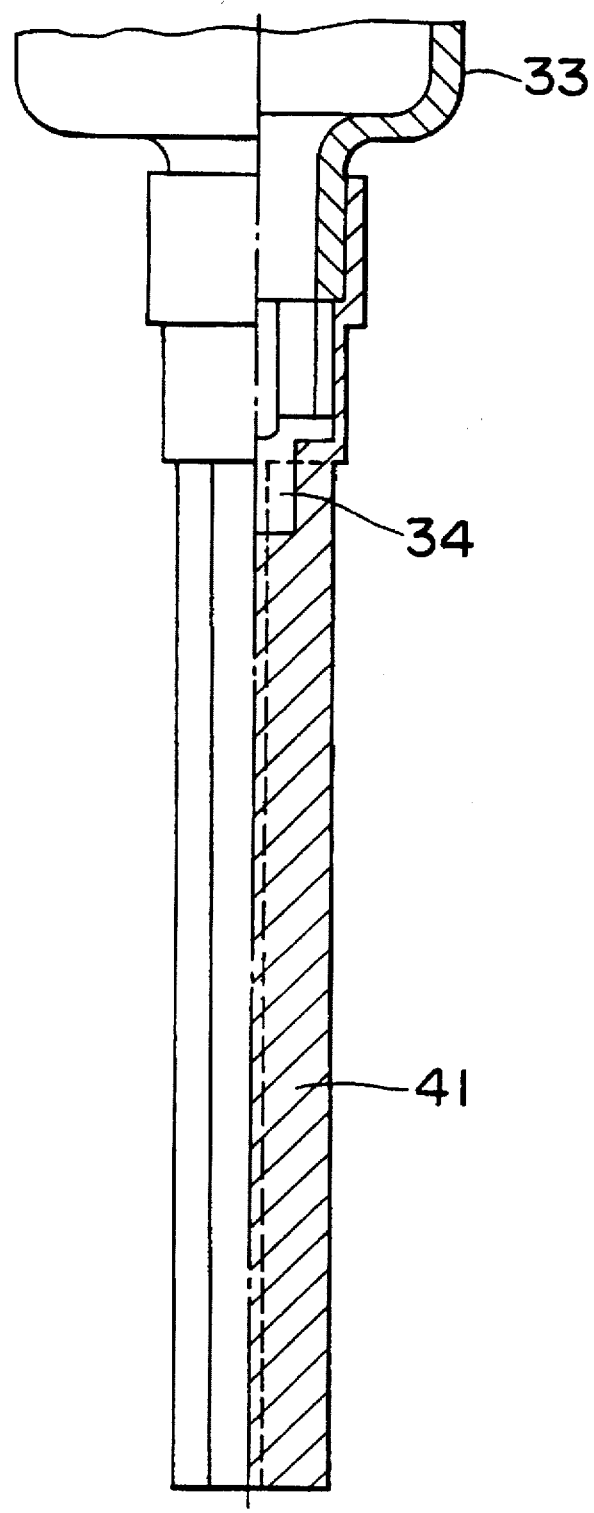
FIG. 26 is a partial cross-sectional view of the pump device in the seventh embodiment.
Figure 43:
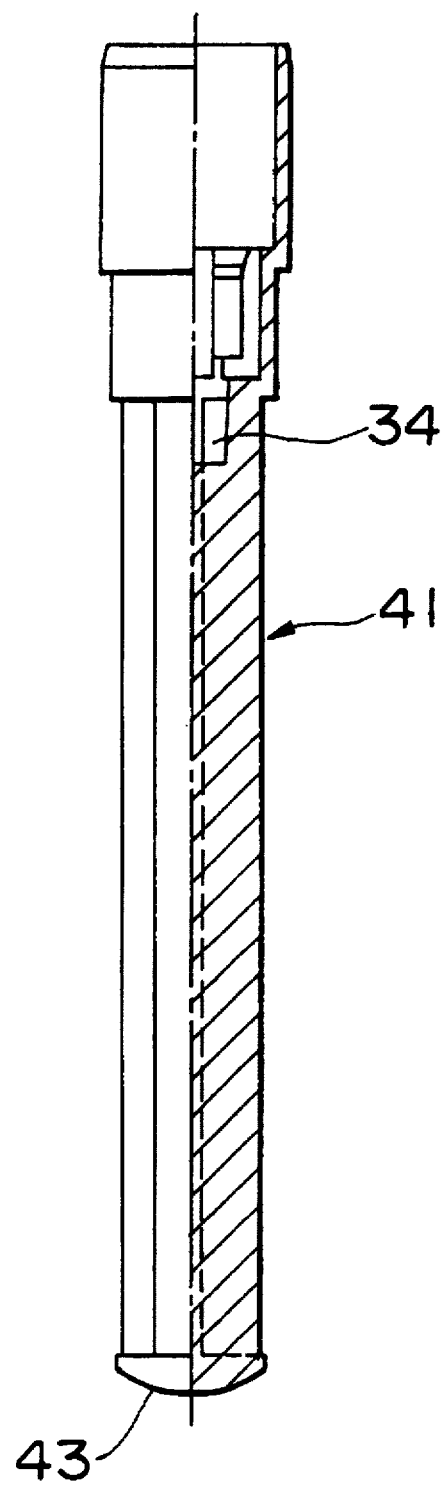
FIG. 43 is a partial cross-sectional view of essential parts of the pump device in the twelfth embodiment.
Figure 44:
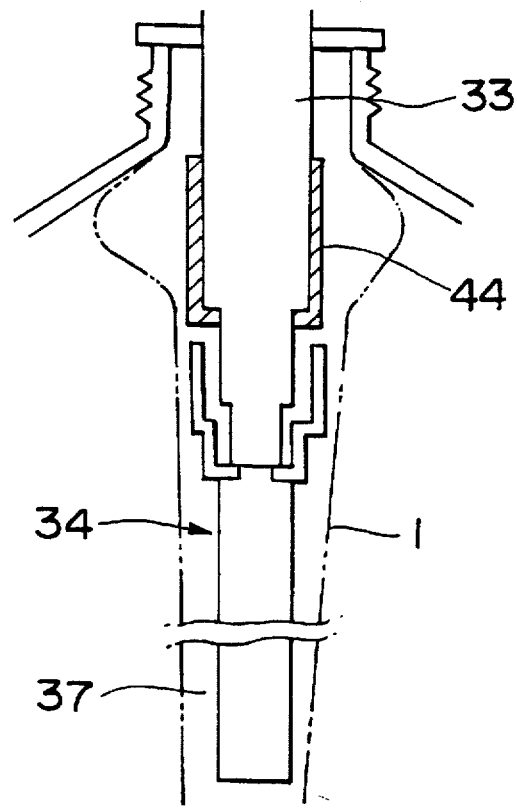
FIG. 44 is a side view of the annulus in the fourteenth embodiment.
Figure 45:
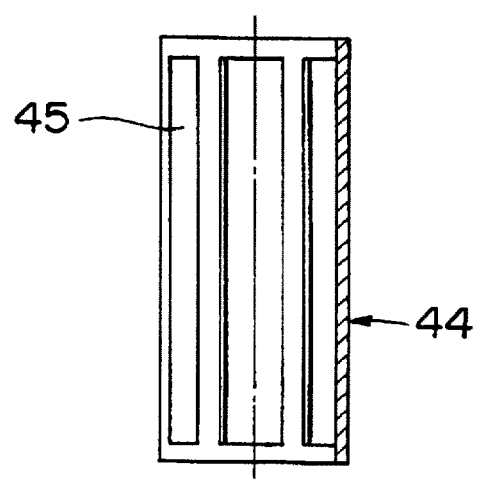
FIG. 45 is a side view of the annulus in the fourteenth embodiment.
Figure 46:
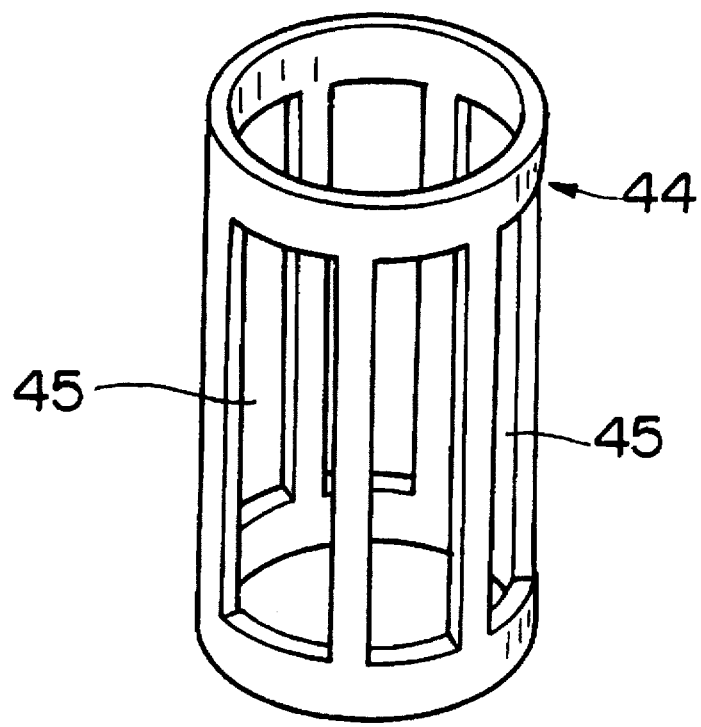
FIG. 46 is a perspective view of the annulus in the fourteenth embodiment.
Figure 47:
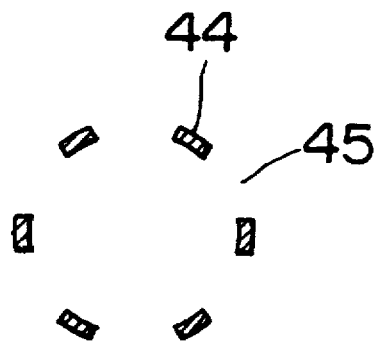
FIG. 47 is a lateral end view of annulus in the fourteenth embodiment.
Figure 48:
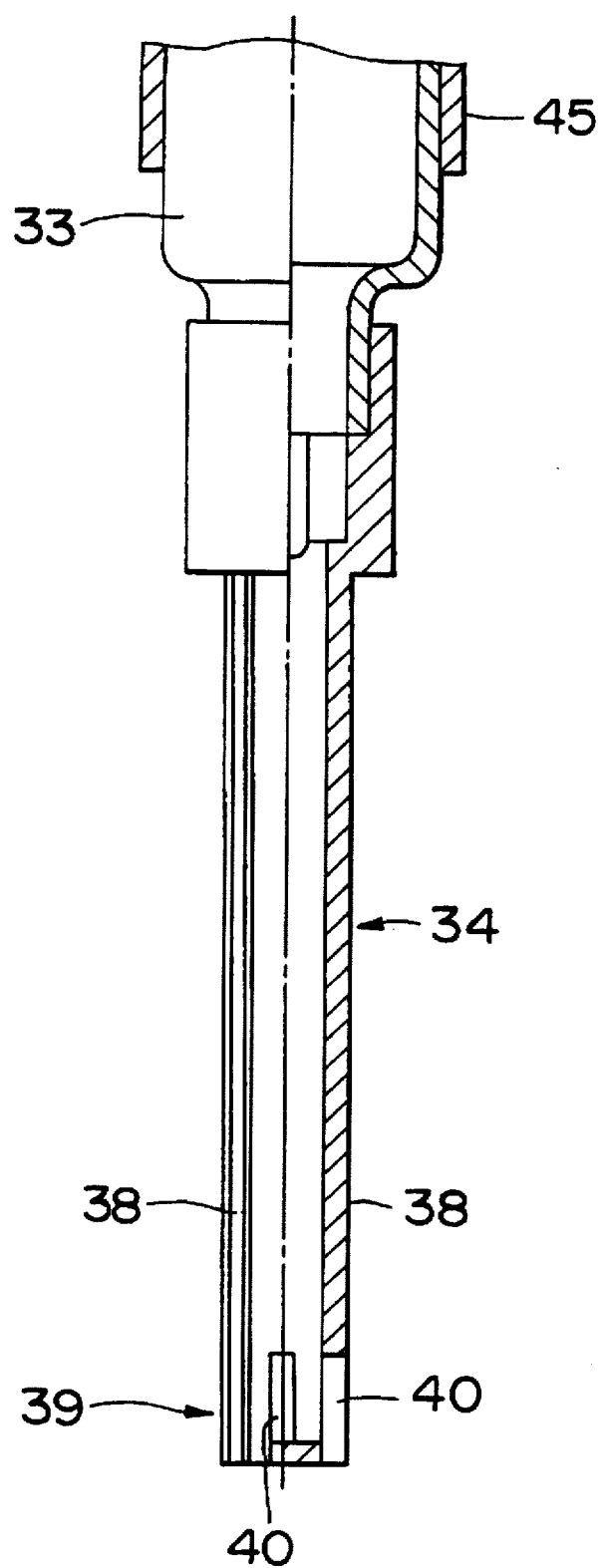
FIG. 48 is a partial cross-sectional view of essential parts of the pump device in the fourteenth embodiment.

In the pump device in accordance with the seventh embodiment of the present invention as shown in FIG. 26, the bag which has shrunk may contact with and be broken by the lower end of the rod 41 which extends to a position immediately below an opening which is the suction portion 34. Consequently, it may also be preferable to form the lower of this rod 41 in the convexed curved configuration 43 as illustrated in FIG. 43. Except that the rod 41 is formed at its end portion in such a curved configuration as above-described, the construction of the pump device is identical with that in the embodiment illustrated in FIG. 26.

[Embodiment 14]

In addition to the pump device of the sixth embodiment of the present invention, it may be preferable to outfit an annulus 44 around the above-described pump 33, as shown in FIG. 44-FIG. 48. The annulus 44 is provided with six slit-like windows with a 60° angular difference in a longitudinal direction. The window which is formed in this annulus can allow the contents which remains in the upper portion of the bag 1 to be guided in a downward direction and delivered completely.

[Embodiment 15]

Figure 49:
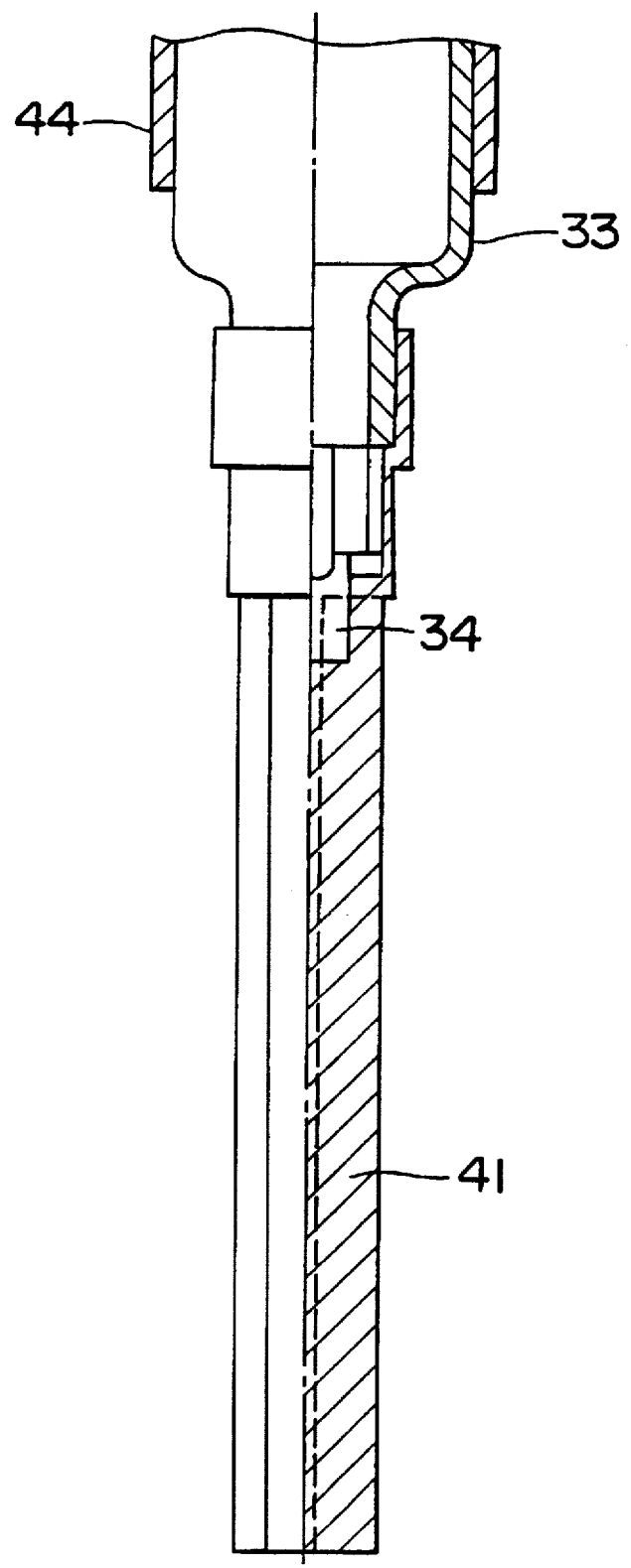
FIG. 49 is a partial cross-sectional view of essential parts of the pump device in the fifteenth embodiment.

Furthermore, FIG. 49 illustrates a fifteenth embodiment of the present invention, wherein the above-described annulus 44 is loaded on the pump device of the seventh embodiment of the present invention shown in FIG. 49. Other features of the embodiment 14 are the same as the those in the fourteenth embodiment.

[Embodiment 16]

Figure 29:
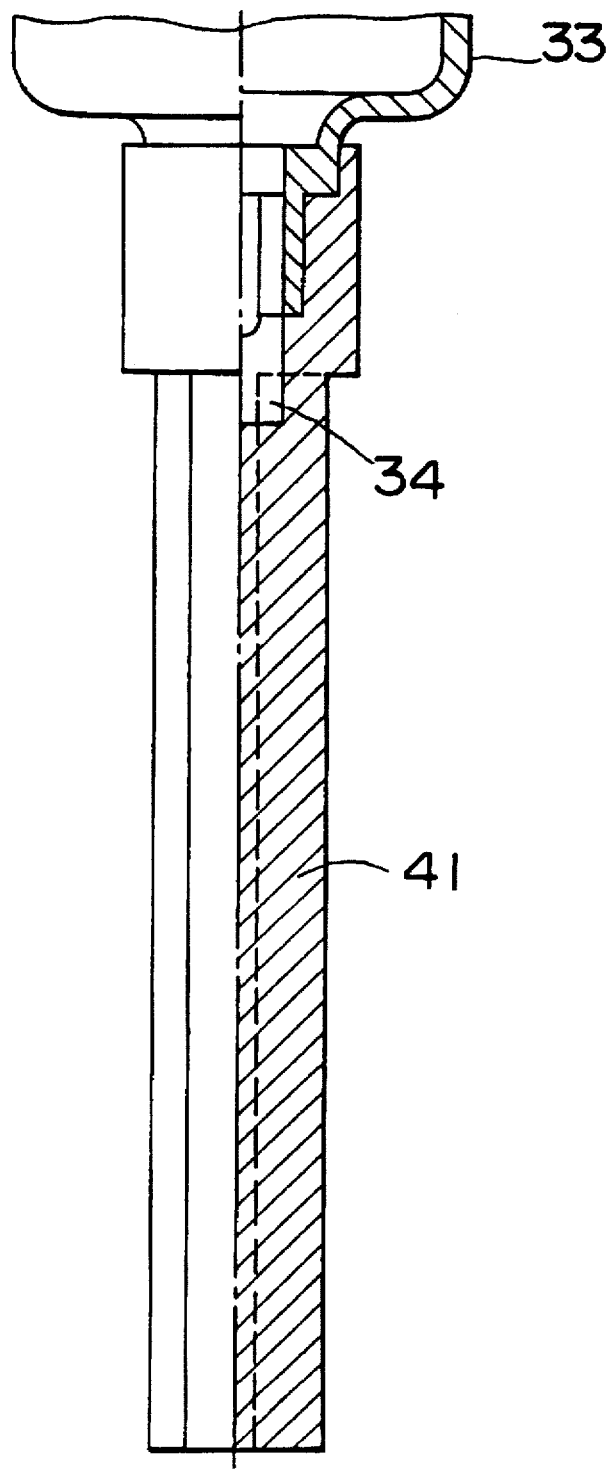
FIG. 29 is a partial cross-sectional view of essential parts of the pump device in the eighth embodiment.
Figure 50:
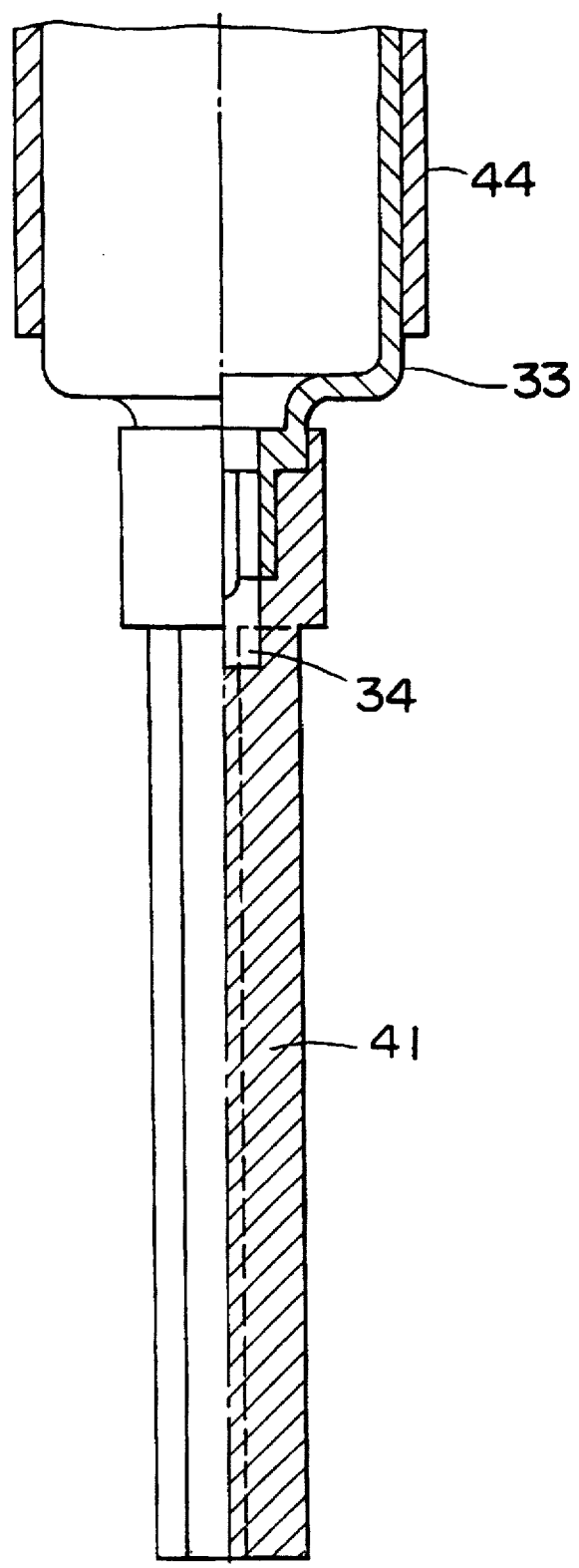
FIG. 50 is a partial cross-sectional view of essential parts of the pump device in the sixteenth embodiment.

FIG. 50 illustrates the annulus 44 which is loaded on the pump device of the eighth embodiment of the present invention shown in FIG. 29, as the sixteenth embodiment of the present invention.

An experiment carried out to compare the residue amount and remaining percentage of the contents indicated that the residue amount was 23.6 g and the residue percentage was 5.75% respectively.

In the meantime, the annulus 44 may be outfitted around the pump 33 in the embodiments 9~13, just in the same manner as that in the embodiments 14~16. The window which is formed in the annulus 44 can allow the content which remains in the upper portion of the bag 1 to be guided in the downward direction and delivered completely.

[Embodiment 17]

Figure 51:
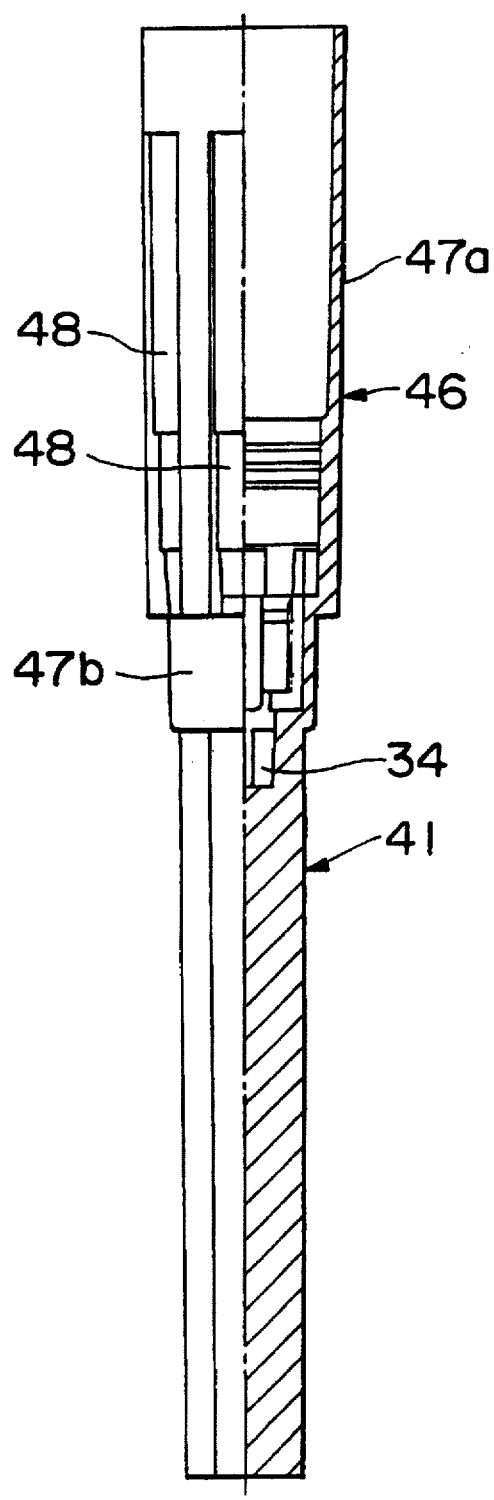
FIG. 51 is a partial cross-sectional view of essential parts of the pump device in the seventeenth embodiment.
Figure 52:
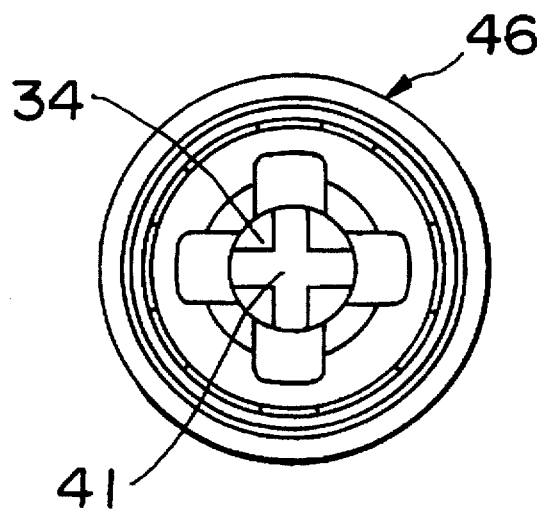
FIG. 52 is a plan view of the pump device in the seventeenth embodiment.
Figure 53:
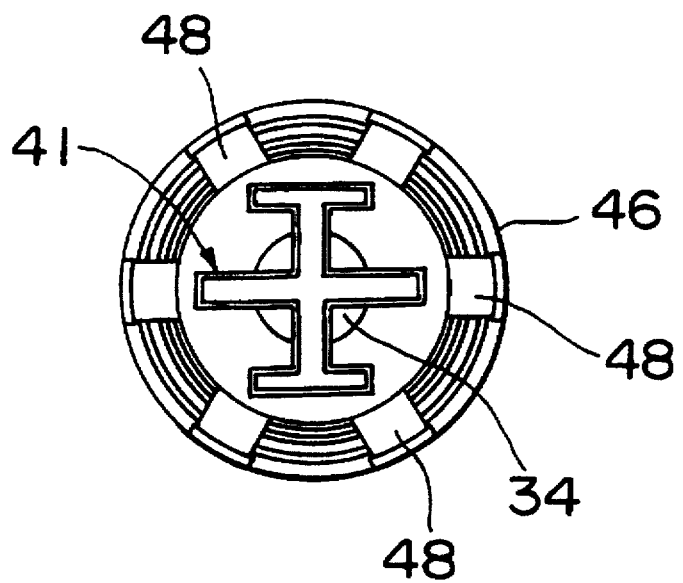
FIG. 53 is a bottom plan view of the pump device in the seventeenth embodiment.

FIG. 51, FIG. 52 and FIG. 53 show a pump device in accordance with the seventeenth embodiment of the present invention. The pump device in this embodiment 1 is constructed such that the contents which remains in the upper portion of the bag 1 may be guided in a downward direction and can be delivered completely, even though the annulus 44 with the window is not loaded in position on the pump 33.

That is, the pump device in this embodiment has its suction portion 34 formed as an opening in the bottom surface of the cylindrical connection 46 to be loaded on the lower end of the pump, rather than a cylindrical configuration.

This connection 46 is provided by integrally forming the first cylindrical portion 47a with the second cylindrical portion 47b which is formed at the lower portion of the first cylindrical portion and has a outer diameter smaller than that of the cylindrical portion.

The first cylindrical portion 47a is formed at its outer circumferential surface with a plurality of grooves 48 each extending in a tangential direction and having a step-like bottom surface, these grooves 48 being provided to maintain an uniform spacing in the circumferential direction. Each of these grooves 48 opens outwardly at the lower end of the first cylindrical portion 47a, that is, at the end of the second cylindrical portion 47b. The bottom surface of this second cylindrical portion 47b, that is, the bottom surface of the connection 46 is provided with the rod 41 in the same manner as that for the pump device of the seventh embodiment shown in FIG. 26. The rod 41 is wholly identical with that shown in the previous seventh embodiment, and so its description is omitted.

In this manner, by forming the cylindrical connection 46 which is loaded on the lower end of the pump 33, and then defining a groove portion 48 which extends in the axial direction around the circumferential surface of the connection, the contents which tend to settle down upon the upper end of the bag which has been shrunk can flow in a downward direction passing through these groove portion 48, and discharged completely.

INDUSTRIAL APPLICABILITY

The present invention is useful when it is embodied as a container containing volatile contents such as, for example, a bottle for agricultural chemicals which tend to vaporize and lose their weight, or a container in which cosmetics and pharmaceutical are contained. Moreover, the present invention will be applicable as a container in which a content-emptying pump is provided at the mouth portion and is used to suck the contents for discharge to the outside.

We claim:

1. A pump device and container, said pump comprising a suction portion inserted into the container, an operable portion exposed to an outside of the container, and a bag provided surrounding said suction portion, said bag containing contents for being loaded into the container, wherein said suction portion is open to a lower end of the pump and further comprises a rod extending toward a bottom of said bag, said rod having an I-beam cross-section with a centrally intersecting beam creating several fluid communication paths along said I-beam rod from said bottom of said bag to said pump, said suction portion further comprises a circular orifice coupled to the pump opened at a bottom end portion thereof, and a plurality of longitudinal grooves are formed around a circumferential surface of said suction portion, said orifice and grooves providing fluid communication paths between said rod and said pump.

2. The pump device and container as claimed in claim 1, wherein said container is a laminated bottle in which an innermost layer and an outer layer adjacent to said innermost layer are made to be freely peelable from each other in order to prevent change in an outer configuration of the bottle.

3. A container with a pump, wherein said container comprises a laminated bottle, said bottle having a mouth portion, a body, a bottom portion, and at least one inner layer and at least one outer layer, said at least one inner layer and said at least one outer layer being bonded at least partially to each other and freely peelable from each other at non-bonded portions, and a pump device inserted into the bottle from said mouth portion, said pump device comprising a suction portion inserted into said bottle and opened, and an operable portion exposed to an outside of the bottle, wherein said suction portion is open to a lower end of the pump and comprises a rod extending toward said bottom portion of said bottle, said rod having a cross-section extending in more than two directions, wherein said bottle has at least one of said inner and outer layers bonded to each other by means of a bonding band, said bonding band being provided in a single length running from said bottle mouth to the bottom portion, said bottle having each of said at least one inner layer bonded together on a rib formed on a bottom parting line formed during molding, whereas each of said at least one outer layer is not bonded together to form a slit between outer and inner layers, said slit admitting air therebetween, and said bottle is provided with a lock portion at least partially at its bottom portion, said lock portion being used to integrally retain the outer and inner layers.

4. The container with a pump as recited in claim 3, wherein said rod cross-section is an I-beam including a centrally intersecting beam.

* * * * *